United States Patent
Imbruce et al.

(10) Patent No.: US 9,600,919 B1
(45) Date of Patent: Mar. 21, 2017

(54) SYSTEMS AND METHODS FOR ASSEMBLING AND/OR DISPLAYING MULTIMEDIA OBJECTS, MODULES OR PRESENTATIONS

(75) Inventors: Doug Imbruce, New York, NY (US); Owen Bossola, Brooklyn, NY (US); Louis Monier, Menlo Park, CA (US); Rasmus Knutsson, New York, NY (US); Christian Le Cocq, Menlo Park, CA (US)

(73) Assignee: YAHOO! INC., Sunnyvale, CA (US)

( * ) Notice: Subject to any disclaimer, the term of this patent is extended or adjusted under 35 U.S.C. 154(b) by 246 days.

(21) Appl. No.: 13/451,483

(22) Filed: Apr. 19, 2012

Related U.S. Application Data

(63) Continuation-in-part of application No. 12/903,723, filed on Oct. 13, 2010, now Pat. No. 9,177,407.

(60) Provisional application No. 61/477,092, filed on Apr. 19, 2011, provisional application No. 61/253,275, filed on Oct. 20, 2009.

(51) Int. Cl.
*G06T 13/00* (2011.01)
*G06T 13/40* (2011.01)

(52) U.S. Cl.
CPC .............. *G06T 13/40* (2013.01); *G06T 13/00* (2013.01)

(58) Field of Classification Search
CPC ......... G06T 13/40; G06T 13/00; G06T 13/80; G06T 13/20; A63F 13/10; G06F 17/30554; G06F 17/30424; G06F 17/30991; G06F 17/30979; G06F 17/30994; G06F 17/3002
See application file for complete search history.

(56) References Cited

U.S. PATENT DOCUMENTS

| | | | |
|---|---|---|---|
| 6,108,033 | A | 8/2000 | Ito et al. |
| 6,173,437 | B1 | 1/2001 | Polcyn |
| 6,271,840 | B1 | 8/2001 | Finseth et al. |
| 6,353,448 | B1 | 3/2002 | Scarborough et al. |

(Continued)

FOREIGN PATENT DOCUMENTS

| | | |
|---|---|---|
| CN | 101262395 A | 9/2008 |
| WO | 2007064715 A2 | 6/2007 |

OTHER PUBLICATIONS

Christel et al., Interactive Maps for a Digital Video Library. Proceedings of IEEE International Conf. on Multimedia Computing and Systems. Florence Italy, Jun. 7-11, 1999, Section 5.

(Continued)

*Primary Examiner* — James A Thompson
*Assistant Examiner* — Xilin Guo
(74) *Attorney, Agent, or Firm* — James J. DeCarlo; Greenberg Traurig, LLP

(57) ABSTRACT

Aspects of the present innovations relate to systems and/or methods involving multimedia modules, objects or animations. According to an illustrative implementation, one method may include accepting at least one input keyword relating to a subject for the animation and performing processing associated with templates. Further, templates may generates different types of output, and each template may include components for display time, screen location, and animation parameters. Other aspects of the innovations may involve providing search results, retrieving data from a plurality of web sites or data collections, assembling information into multimedia modules or animations, and/or providing module or animation for playback.

20 Claims, 15 Drawing Sheets

(56) References Cited

U.S. PATENT DOCUMENTS

| | | | |
|---|---|---|---|
| 6,535,888 B1 | 3/2003 | Vijayan et al. | |
| 6,567,103 B1 | 5/2003 | Chaudhry | |
| 6,574,417 B1 | 6/2003 | Lin et al. | |
| 7,200,820 B1 | 4/2007 | Stephens | |
| 7,536,706 B1 | 5/2009 | Sezan et al. | |
| 7,613,731 B1 | 11/2009 | Larson | |
| 7,725,451 B2 | 5/2010 | Jing et al. | |
| 7,836,110 B1 | 11/2010 | Schoenbach et al. | |
| 7,895,193 B2 | 2/2011 | Cucerzan et al. | |
| 7,912,827 B2 | 3/2011 | Byers et al. | |
| 7,962,128 B2 | 6/2011 | Neven et al. | |
| 8,055,655 B1 | 11/2011 | He et al. | |
| 8,078,650 B2 | 12/2011 | McHugh et al. | |
| 8,244,707 B2 | 8/2012 | Lin et al. | |
| 8,255,291 B1 | 8/2012 | Nair | |
| 8,352,443 B1 | 1/2013 | Polson et al. | |
| 8,549,436 B1 | 10/2013 | Capriati et al. | |
| 8,577,911 B1 | 11/2013 | Stepinski et al. | |
| 8,639,034 B2 | 1/2014 | Liu et al. | |
| 8,769,053 B2 | 7/2014 | Spitz et al. | |
| 8,782,690 B2 | 7/2014 | Briggs et al. | |
| 8,813,132 B2 | 8/2014 | Andrews, II et al. | |
| 9,147,154 B2 | 9/2015 | Wang et al. | |
| 9,183,277 B1 | 11/2015 | Kurzion et al. | |
| 2004/0059720 A1 | 3/2004 | Rodriguez | |
| 2004/0205515 A1 | 10/2004 | Socolow et al. | |
| 2005/0216859 A1* | 9/2005 | Paek et al. | 715/810 |
| 2006/0253436 A1 | 11/2006 | Cook et al. | |
| 2007/0008322 A1 | 1/2007 | Ludwigsen | |
| 2007/0078872 A1 | 4/2007 | Cohen | |
| 2007/0101387 A1 | 5/2007 | Hua et al. | |
| 2007/0185860 A1* | 8/2007 | Lissack | 707/5 |
| 2007/0203945 A1 | 8/2007 | Louw | |
| 2007/0214121 A1 | 9/2007 | Ebanks | |
| 2007/0234214 A1 | 10/2007 | Lovejoy et al. | |
| 2007/0250899 A1 | 10/2007 | Rhodes et al. | |
| 2007/0294619 A1 | 12/2007 | Krishnaswamy et al. | |
| 2008/0027928 A1 | 1/2008 | Larson | |
| 2008/0028023 A1 | 1/2008 | Locke | |
| 2008/0028037 A1* | 1/2008 | Moyer et al. | 709/217 |
| 2008/0086688 A1 | 4/2008 | Chandratillake et al. | |
| 2008/0215416 A1 | 9/2008 | Ismalon | |
| 2008/0244373 A1 | 10/2008 | Morris et al. | |
| 2008/0276269 A1 | 11/2008 | Miller et al. | |
| 2009/0003800 A1* | 1/2009 | Bodin et al. | 386/109 |
| 2009/0019034 A1 | 1/2009 | Franks et al. | |
| 2009/0019078 A1 | 1/2009 | Chisholm et al. | |
| 2009/0063423 A1 | 3/2009 | Jackson et al. | |
| 2009/0077037 A1 | 3/2009 | Wu et al. | |
| 2009/0271842 A1 | 10/2009 | Baumhof | |
| 2009/0313260 A1 | 12/2009 | Mimatsu | |
| 2009/0327268 A1 | 12/2009 | Denney et al. | |
| 2010/0083077 A1 | 4/2010 | Paulsen et al. | |
| 2010/0146042 A1 | 6/2010 | Kruhoeffer et al. | |
| 2010/0211565 A1 | 8/2010 | Lotito | |
| 2010/0332489 A1 | 12/2010 | Benari et al. | |
| 2010/0333123 A1 | 12/2010 | Mehta | |
| 2011/0010367 A1* | 1/2011 | Jockish et al. | 707/733 |
| 2011/0060756 A1 | 3/2011 | Schoenbach et al. | |
| 2011/0064387 A1 | 3/2011 | Mendeloff et al. | |
| 2011/0161308 A1 | 6/2011 | Andersen et al. | |
| 2011/0161333 A1 | 6/2011 | Langseth et al. | |
| 2011/0191321 A1 | 8/2011 | Gade et al. | |
| 2011/0196864 A1 | 8/2011 | Mason et al. | |
| 2011/0225066 A1 | 9/2011 | Carter | |
| 2011/0276555 A1 | 11/2011 | Fiero | |
| 2011/0288913 A1 | 11/2011 | Waylonis et al. | |
| 2012/0047134 A1 | 2/2012 | Hansson et al. | |
| 2012/0051668 A1* | 3/2012 | Martin et al. | 382/305 |
| 2012/0059838 A1* | 3/2012 | Berntson et al. | 707/759 |
| 2012/0203757 A1 | 8/2012 | Ravindran | |
| 2012/0211565 A1 | 8/2012 | Colavito et al. | |
| 2012/0249870 A1 | 10/2012 | Senster | |
| 2012/0278465 A1 | 11/2012 | Johnson | |
| 2012/0323897 A1 | 12/2012 | Daher et al. | |
| 2013/0097125 A1 | 4/2013 | Marvasti et al. | |

OTHER PUBLICATIONS

Delgado, Diogo, Automated Illustration of Multimedia Stores thesis, Jul. 28, 2010.

International Search Report and Written Opinion for PCT/US2012/034324, dated Jul. 26, 2012, 7 pgs.

Geurts et al., "Towards Ontology-Driven Discourse: From Semantic Graphs to Multimedia Presentation", The Semantic Web-ISWC 2003. Lecture Notes in Computer Science vol. 2870. 2003, pp. 597-612.

Joshi et al., The Story Picturing Engine-A-System for Automatic Text Illustration. ACM Transactions on Multimedia Computing, Communications and Applications, vol. 2, No. 1, Feb. 2006, pp. 68-89, Section 2.5.

Mani et al., Using Summarization for Automatic Briefing Generation. Briefing Generation Proceedings of the 2000 NAACL-ANLP Workshop on Automatic Summarization, vol. 4, pp. 99-108, p. 102 right column., par. 2.

McKeown et al., Generating Multimedia Briefings: Coordinating Language and Illustration. Artificial Intelligence 103 (1998), pp. 95-116, Section 3.

Weal et al., Ontologies as Facilitators for repurposing Web Documents. Int. J. Human Computer Studies 65 (2007) 537-562, Section 2.3.

Agarwal, Amit; "How to Embed Almost Anything in your Website" (2009).

Crosby, Connie; "Prezi: Shaking Off the PowerPoint Death Grip", http://www.slaw.ca/2010/10/25/prezi-shaking-off-the-powerpoint-death-grip/ (2010).

European Search Report in correspopnding EP Application No. 12859456.1 mailed Jan. 7, 2016.

https://getsatisfaction.com/prezi/topics/creating links that jump to other parts of the prezi (2010).

International Search Report (PCT/US13/45529) dated Feb. 27, 2014; 4 pages.

Limpag, Max, "Forget PowerPoint wow 'em with Prezi", http://max.impag.com/article/powerpoint-prezi-presentation (2011).

O'Neill, Megan, "7 Little Known Tricks That Will Get You More YouTube Views", http://www.adweek.com/sociatimes/get-more-youtube-views/44158 (2011).

Supplemental European Search Report (EP12857892) dated Mar. 24, 2016.

* cited by examiner

SYSTEMS AND METHODS FOR ASSEMBLING AND/OR DISPLAYING MULTIMEDIA OBJECTS, MODULES OR PRESENTATIONS

CROSS-REFERENCE TO RELATED APPLICATIONS

This application claims benefit/priority of provisional application No. 61/477,092, filed Apr. 19, 2011, and is a continuation-in-part of application Ser. No. 12/903,723, filed Oct. 13, 2010, published as US2011/0115799 A1, which claims benefit/priority of provisional application No. 61/253,275, filed on Oct. 20, 2009, all of which are incorporated herein by reference in entirety.

APPENDIX

This application contains an listing of associated code relating to the disclosure and claims herein, and attached hereto as the Appendix.

BACKGROUND

Currently, consumer or professional publishers with the desire to create multimedia content for the Internet find the process extremely cumbersome. Using existing technology it is difficult for consumers to create multimedia presentations. Narrative—or playable—content on the internet primarily exists in the form of streaming video. This poses several problems for content creators. First of all, media consumers are sophisticated and recognize the difference between professionally produced video projects and amateur ones. Most consumer devices display High Definition video and most people are used to seeing that level of quality in media they consume. Therefore, a producer of online content must invest significant time and money to create video content at the level to which consumers have grown accustomed. Producer must hire a professional production crew, on-camera talent and equipment—such as professional lighting kit, high-end cameras, and audio gear. There may even be legal concerns such as talent releases and rights to music and images.

The video post-production process is also time consuming. Consumers use a variety of offline tools (including Apple's iMovie software and Microsoft's PowerPoint) to generate multimedia. The output produced by these tools is then saved to a user's hard drive and uploaded to sites allowing users to share the output with friends and colleagues (such as with YouTube, SlideShare, etc.). Professional publishers wishing to create appealing multimedia presentations follow the same process with a set of more expensive software packages (e.g. Final Cut Pro or Avid). Each piece of software not only requires a financial commitment, but there is also a high learning curve when it comes to using it. Producing professional video may also require a skilled editor with technical and story-telling skills, a graphic designer, special effects artist and narrator. Editing software also requires sophisticated, expensive and fast computing/storage equipment and therefore uses a lot of computing resources.

Another issue for consumers is the inadequate information that results from a traditional internet search result. Generally, when an end user performs an Internet search, the search engine produces a search results page (also called a "SERP"). On that page is a list of results with hyperlinks and a sentence or two about each result. That text is machine-selected by proprietary algorithms unique to each search engine—as opposed to being curated by humans. Often, it is not an adequate description of the linked site. That selected text is called a "caption." Captions were first invented when there was no rich media on the web and, therefore, were only text-based. This method of displaying search results has changed very little in fifteen years. Users are forced to visit a plurality of web sites to discover information they are seeking. The experience is cumbersome and time consuming.

As set forth below, one or more features of the present inventions may overcome these or other drawbacks and/or otherwise impart innovative aspects.

BRIEF DESCRIPTION OF THE DRAWINGS

The accompanying drawings, which constitute a part of this specification, illustrate various implementations and aspects of the present invention and, together with the description, explain various features of the innovations herein. In the drawings.

DETAILED DESCRIPTION OF ILLUSTRATIVE IMPLEMENTATIONS

Figure 1:
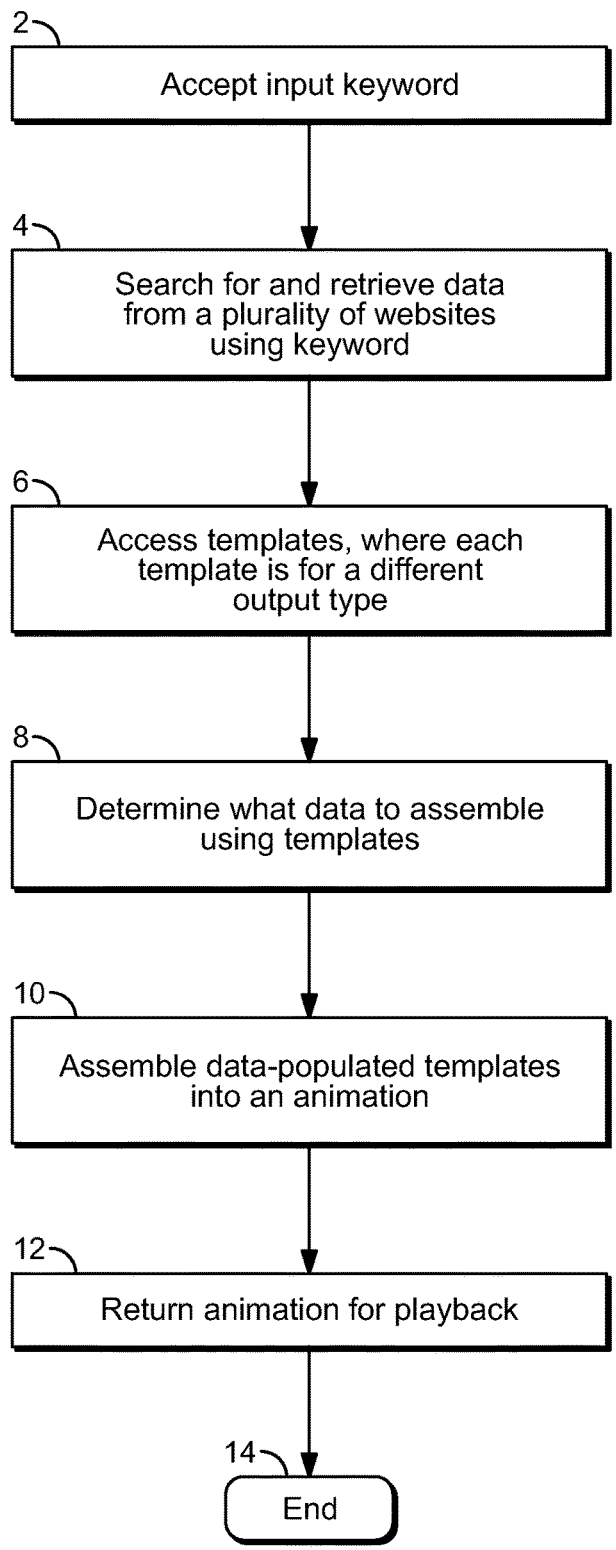
FIG. 1 is a representative block/flow diagram showing an illustrative method consistent with one or more aspects related to the innovations herein.

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present inventions. Wherever possible, the same reference numbers will be used throughout the drawings to refer to the same or like parts.

In some illustrative implementations of the innovations herein, systems and methods for automatically assembling multimedia objects, modules or presentations (also referred to as animations) may be provided. Here, for example, digital content may be aggregated and assembled into a rich, mixed-media capable, interactive component referred to as a Qwiki. According to certain implementations, methods may include accepting at least one input keyword relating to a subject for the animation and accessing a set of templates. For example, one or several words that the user has typed can be selected from a menu or highlighted in other text in order to be selected and accepted for input. In such implementations, each template may generate a different type of output, and each template includes components for display time, screen location, and animation parameters. In some instances, the method may also include retrieving data from a plurality of web sites or data collections dynamically using an electronic search based on at least one input keyword and the templates, determining which retrieved data to assemble into the set of templates, coordinating assembly of data-populated templates to form the animation, and returning the animation for playback. The resulting Qwiki is an interactive narrative presentation of the content that is being searched and it features an interactive layer which allows the recipient of the search result to receive more detailed information without leaving the search results page. According to some implementations, a Qwiki integrated search result may include features that are innovative over existing systems due to the information density and mixed-media/multimedia capabilities of a Qwiki integrated component.

Other illustrative implementations of the innovations herein involve systems and methods for automatically assembling an animation. In such implementations, the system may include a query interface for presentation to a user, where the query interface is used to accept at least one input keyword relating to a subject for the animation, and a database having a set of templates. Here, for example, each template may generate a different type of output, and each template may include components for display time, screen location, and animation parameters. The system may also includes a searching engine to retrieve data from a plurality of web sites or data collections dynamically using an electronic search based on the at least one input keyword and the templates, a runtime engine to determine which data to assemble into the set of templates and to coordinate assembly of data-populated templates to form the animation, and a presentation engine to present the animation for playback to the user.

Still other implementations herein include or involve features that give users capabilities of manually authoring a Qwiki. Here, for example, such Qwiki creator functionality gives a user manual control over a Qwiki, such as how it may appear (e.g., on a SERP) and its form (e.g., interactive caption(s), etc.).

In example embodiments, the above features may be used individually or in combination with one another or with one or more of the features described in the description below.

Example embodiments may include a computer system having at least one processor, at least one memory, and at least one program module, the program module stored in the memory and configured to be executed by the processor, wherein the at least one program module includes instructions for performing one or more of the features described above or in description below. In another example embodiment, a computer readable medium is provided with executable instructions for performing one or more of the features described above or in the description below.

A. Overview

Some systems and methods according to exemplary implementations of the innovations herein for assembling dynamically animated media based on keyword and string input may serve the following purposes: to produce superior multimedia results for any keyword based Internet search, and/or to allow consumers and professional publishers to easily create multimedia content for the web. Qwiki allows for the creation of light-weight, mixed/multimedia presentations in a way that isn't possible with current technology. Further, in some implementations, users may manually author the modules and/or manually assemble the input which may provide advantages involving improved user friendliness and creation of multimedia modules or presentations that are easier to navigate or search due to the human touch they possess. Here, for example, a user may manually construct a Qwiki by selecting the audio, video and storyline, and by inserting the links and other multimedia elements/files precisely 'how' and 'where' they desire these elements to reside.

FIG. 1 is a flow diagram showing a method according to one embodiment of the invention. In this embodiment, the first step (block 2) involves accepting at least one input keyword (which, for example, can be one or several words that the user has typed or selected from a menu) relating to a subject for the animation. In the next step (block 4), the keyword or keywords are used for searching for and retrieving data from a plurality of web sites or other data collections dynamically using an electronic search based on the at least one input keyword. In block 6, the method can access one or more templates, where each template is for a different output type. For example, in one embodiment, each template generates a different type of output and each template includes components for display time, screen location, and animation parameters. In some embodiments, the search and retrieval of data can be based in part on requirements of the template or templates.

The next step (block 8) in the embodiment of FIG. 1 involves determining which retrieved data to assemble into the template or set of templates. As an example, the most suitable data for the desired presentation or a coherent presentation can be assembled into the template or templates. Block 10 involves coordinating assembly of data-populated templates to form the animation. This step can be performed so that the presentation is coherent in terms of the overall organization of templates to form the presentation. Block 12 involves returning the animation for playback by a user, after which the method is complete (block 14).

1. Content Creation

Employing a system for assembling dynamic animated media based on keyword and string input or content selection, in one embodiment, the system and method are able to evaluate by consumers and publishers, and use this text to generate—on the fly—an appealing multimedia presentation describing the same. Thus, the process for developing compelling multimedia content is drastically simplified. In addition to such automated systems and methods of creating Qwiki presentations, a user may author a Qwiki presentation by manually assembling (or editing) online content into a playable presentation.

2. Searching

Typically, users conducting keyword searches on the Internet receive as output a SERP ("Search Engine Results Page"). These pages currently contain a list of links and text excerpts from web pages identified as matches. Often times, these web page results are listed with other media types (news items, images, etc.) that also match the user's query. However, as the Web grows, and the consumption of multimedia content drastically increases, this traditional search experience becomes less relevant—and less useful.

Systems and methods according to certain embodiments herein may involve mechanisms that evaluate a user's search terms and assemble, on the fly, a multimedia presentation that presents the results of the user's query—whether those results are a narrated definition of the user's search, an answer to a specific question asked by the user, or another form of data presented in a manner consistent with user expectations upon conducting an Internet search using specific words or phrases. In one embodiment, the software then archives each presentation and allows other users to improve the accuracy of the presentation via a set of browser-based editing tools.

3. Assembling Presentations

Accordingly, the system of an example embodiment can be a robust solution offered as a hosted service. It can be used for creating dynamically generated multimedia presentations which display general Internet search results or, in some applications, vendor specific data and for creating short multimedia presentations authored by consumers or professional authors.

It can also function as a business-oriented web application allowing professional publishers to develop appealing multimedia presentations based on a dynamic set of web data and as an API allowing third parties to integrate multimedia creation functionality directly into their web applications. In an example embodiment, the system is a rapid and simple solution for consumer users and generated by program, or any combination of these creation methods. In other words, the multimedia modules herein aren't just machine generated; they are authored by humans in both professional and consumer environments.

Much of the discussion set forth below focuses on use of XML or another Data Description Language such as JavaScript Object Notation (JSON). These are meant to be examples only, and other languages and data types can be used in other embodiments. In addition, specific examples of types of scenes, data types, and instructions are set forth below. These scenes, data types, and instructions are examples only and can vary in other embodiments.

B. Animation

Figure 2:
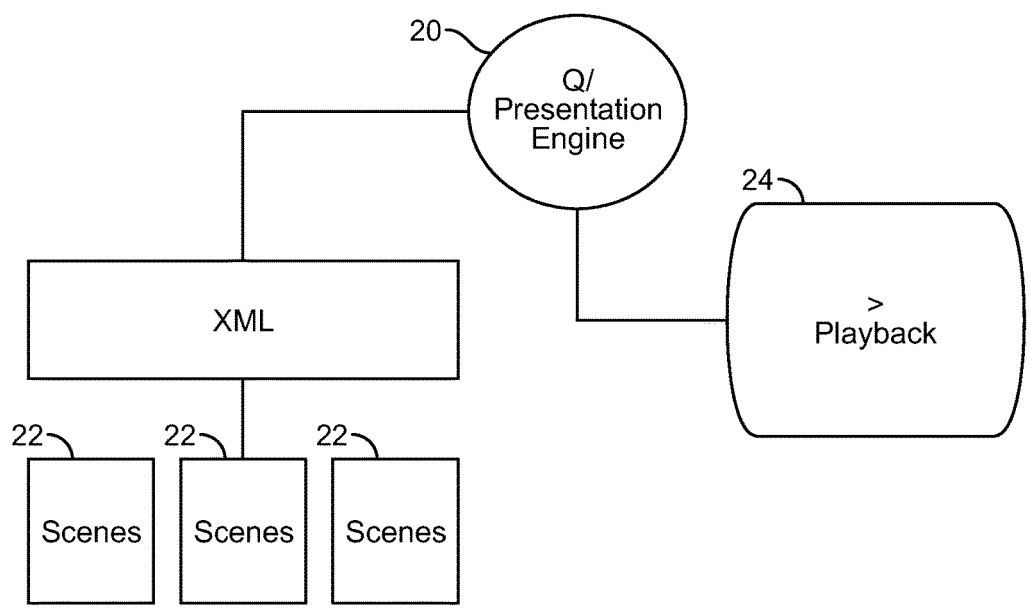
FIG. 2 is a representative system diagram showing an illustrative presentation engine system consistent with one or more aspects related to the innovations herein.

According to one embodiment, the media creation engine is based upon a library of pre-fabricated and custom-defined "scenes" whose playback is governed by machine or user-customized XML input (or other input types) displayed by a presentation engine. FIG. 2 sets forth such a presentation engine 20, along scenes 22 and an indication of the ability to playback 24 an animation.

The presentation engine 20 (also called the "Qwiki presentation engine" in FIG. 2) may include pre-fabricated scenes 22 that animate, for example, one or more of the following: Standard strings of text; Bulleted lists of text; Images & Video; Dates; Quality ratings (e.g., "5 stars", etc.); Addresses & Maps; Line graphs; Pie charts; Timelines; Ranges; Internet URLs; and/or Yes/No Data Points Each scene 22 may comprise one or more of the data types mentioned above. Optionally, new scenes 22 can be created that contain multiple data types—using XML markup (as shown in the example of FIG. 2), a developer defines a new type of scene on the fly. For example, the type of scene can be a map being displayed alongside text or a star rating describing a local business.

In one embodiment, each animation can be composed of successions of screens composed of a maximum of 14 scenes, with each scene running seconds and including transitions lasting 1-2 seconds. The number of scenes and time for each scene can vary widely within example embodiments of the invention.

In one embodiment, each animation can be composed of successions of screens, which may have a set maximum of scenes, with each scene running seconds and including transitions lasting 1-2 seconds. The number of scenes and time for each scene can vary widely within example embodiments of the invention. In one implementation, the maximum quantity of scenes in succession may be 14.

As set forth above for one embodiment, the look and feel of each presentation is defined by an XML document (or other type of document) that governs playback of the presentation. In one example embodiment, the first step in creating an XML document that defines a presentation may involve assigning values to about seven main options for presentation playback, including for example one or more of the following, Descriptive Name, Music mp3 URL, Narration Text OR Narration mp3 URL, Background Image, Size, Included Scenes and order of play, and Start Mode (Play or Browse).

In addition, in such embodiments, there may be several XML components generic to any presentation that coordinate on-screen action. In addition, other types of components may be used. Examples include one or more of the following: Display Time sets the amount of time the scene is visible (this can be auto-calculated by the presentation engine, but can also be available as a customized option for users); Movement sets the on-screen XY location of the scene in relation to the player. If set to "full screen", for example, the scene will occupy the full real estate of the player for the amount of time it is displayed; parameters govern the manner in which each scene transitions into another, by selecting from a library of pre-created transitions addressed by human readable names; and onClick specifies a URL to open in a new window upon a mouse click.

The included scenes and order of play can be defined within the same file (such as an XML file) that lists the main options for playback via a set of programmatic instructions specific to each scene type. Many types of scene structures may be used within the scope of example embodiments of the invention, including one or more of the following example scene structures:

1. TEXT—including_XML Data type name: "Text" and Default Components including: Display Time, Movement including:Initial_State (XY coordinates) and Final_State (XY Coordinates), onClick, and Transition. Scene Specific Components, including: Background Color, Text Title, Text-Body, Font Color and Font Size.

2. BULLETED LISTS OF TEXT—including_XML Data type name: "List," Default Components including: Display Time, Movement including: Initial_State (XY coordinates) and Final_State (XY Coordinates); onClick, and Transition, Scene Specific Components including: Background Color, List Title, Per list item: List item text, Font Color, and Font Size.

3. IMAGES—including, XML Data type name: "Image," Default Components including: Display Time, Movement including InitialState (XY coordinates) and Final_State (XY Coordinates); onClick and Transition; Scene Specific Components including: Image URL, KenBurns including: StartXYI, StartXY2, EndXYI, and EndXY2; Caption.

4. MEDIA—XML Data type name: "Media" including Default Components including: Display Time, Movement including Initial_State (XY coordinates) and Final_State (XY Coordinates); onClick and Transition; Scene Specific Components including: Media URL.

5. DATE—XML Data type name: "Date," Default Components including: Display Time, Movement including Initial_State (XY coordinates) and Final_State (XY Coordinates); onClick, Transition, Scene Specific Components including: Background Color, Date, Text Title, Text Body, Font Color, Font Size, Effect.

6. RATING—XML Data type name: including Default Components including: Display Time, Movement, including Initial_State (XY coordinates) and Final_State (XY Coordinates); onClick, Transition; Scene Specific Components including: Text Title, Rating Value, Rating Range Start, Rating Range End, Empty Rating ImageURL, Half Rating Image URL, Font Color, Font Size.

7. ADDRESSES & MAPS—XML Data type name: "Map," Default Components including: Display Time, Movement including Initial State (XY coordinates) and Final_State (XY Coordinates); onClick, Transition; Scene Specific Components including: Title, Lat, and Long.

8. LINE GRAPHS—XML Datatype name: "Line_Graph," Default Components including: Display Time, Movement including Initial_State (XY coordinates) and Final_State (XY Coordinates); onClick, Transition; Scene Specific Components including: Title, X-Axis Label, Y-Axis Label, Title Color, Graph Color, Background Color, Text Size, Per data point including: X value, Y value and Label.

9. PIE CHARTS—XML Data type name: "Pie_Chart," Default Components including: Display Time, Movement including InitialState (XY coordinates) and Final_State (XY Coordinates); onClick, Transition; Scene Specific Components including: Background Color, Title, Font Color, Font Size, Per slice including: Label, Percentage, Text Color, Slice Color, and Text Size.

10. TIMELINES—XML Data type name: "Timeline," Default Components including: Display Time, Movement, including, Initial_State (XY coordinates) and Final_State (XY Coordinates); onClick, Transition; Scene Specific Components including: Background Color, Title, Text Color, Text Size, Line Color, Per Event including: Title, Date, Description, Image URL.

11. RANGE—XML Data type name: "Range," Default Components including: Display Time, Movement including: InitialState (XY coordinates) and Final_State (XY Coordinates), onClick, Transition; Scene Specific Components including: Background Color, Text Title, Font Color, Font Size, Movement, including Initial_State (XY coordinates) and Final_State (XY Coordinates); onClick, Transition; Scene Specific Components including: Background Color, Title, Text Color, Text Size, Line Color, Per Event including: Title, Date, Description, and Image URL.

12. RANGE—XML Data type name: "Range," Default Components including: Display Time, Movement including InitialState (XY coordinates) and Final_State (XY Coordinates); onClick, Transition; Scene Specific Components including: Background Color, Text Title, Font Color, Font Size, Label, Value (Yes/No/Neutral), Font Color, and Font Size.

As utilized in conjunction with the innovations set forth below and elsewhere herein, such features help provide Qwiki's unique animation platform, which allows a creator to author an animation in flash and import that animation into Qwiki, dynamically populating via a Qwiki-based tool or API—the animation then plays back through the Qwiki rendering system, which is a cross-platform system that supports the web, iOS and Android platforms, among others.

In some implementations, the master settings, as well as labels and settings for each scene, together combine into a single file (such as an XML file) that is interpreted by the presentation engine at run-time and generates an animation displayed to the user in an example embodiment.

2. Defining Custom Scenes

In another implementation, via utilization of a scripting language (such as, but not limited to, XML scripting language), new scenes can be defined that incorporate different, pre-existing data types (i.e., the previously-mentioned map example combining a text scene and a map scene into a single, new type of scene for business addresses). Creators can use authoring tools to define new template-based "scenes" for inclusion in Qwikis that are rendered cross-platform (including iPhone and Android).

Figure 3:
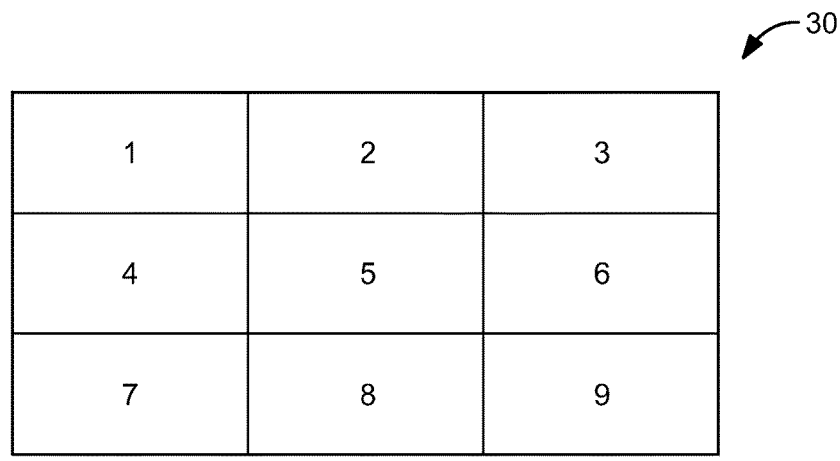
FIG. 3 is a representative system diagram showing an illustrative system of scenes consistent with one or more aspects related to the innovations herein.

In some implementations, any of the thirteen component pre-fabricated scenes set forth above, or new custom scenes defined by developers, are positioned within a single, new scene by specifying their location within the displayed animation based on coordinates of a 3×3 XY grid 30 (see FIG. 3). These scene configurations are stored for reuse and made addressable by assigning them a human-readable name.

3. Animation & Playback

Aspects providing improved multimedia modules or presentations set forth herein involve the manner in which the information contained within the templates is linked and presented as a cohesive movie or video clip.

Figure 4:
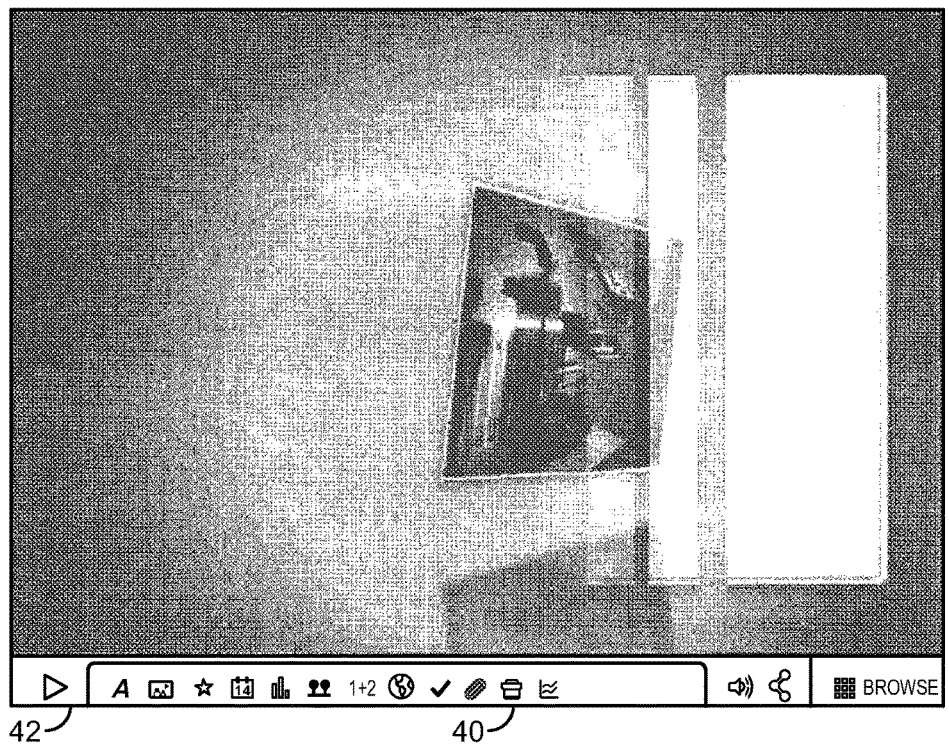
FIG. 4 is a representative screenshot showing an illustrative playback screen consistent with one or more aspects related to the innovations herein.

In one embodiment, to begin, upon loading, the presentation engine plays the animation from start to finish by reading from an XML that defines playback, in the manner depicted in FIG. 4. Note the "Chapter Menu" 40 on the bottom of the player—using this menu, users can preview and advance to any scene contained within a presentation. FIG. 4 is a screen-capture of the transition between two scenes, one containing an image, and the other containing text.

Figure 5:
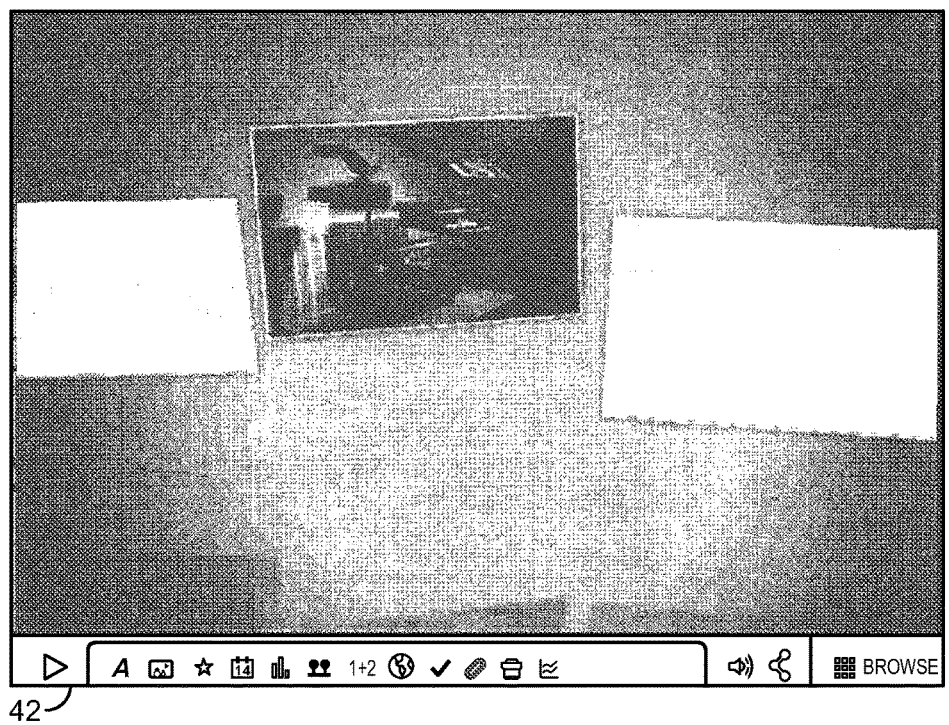
FIG. 5 is a second representative screenshot showing an illustrative playback screen consistent with one or more aspects related to the innovations herein.

At any point, users can also interrupt the playback to browse the floating templates and manually expand/collapse them by clicking the browse button (or anywhere on the video), then resume playback via the play button 42 on the control bar. See, for example, FIG. 5. This interactivity helps provides various innovative aspects to the Qwiki technology. For example, it may add value to the multimedia content because the interactivity may result in the generation of new searches, increased consumption of content (including advertising) and a greater amount of time spent using a search engine or exploring a website.

Different types of scenes may also have various interactive triggers that will pause playback. For example, users can click a "Read More" button on a text scene, at which point playback will pause and users will be able to scroll to read additional text beyond what has been displayed on-screen in any given text template. Features involving such layer of interactivity help impart innovations over current technologies, for example, in the manner they allow a consumer to explore what interests them most in a presentation. The Qwiki is a short story that also allows for greater depth because of the interactivity. It may be three minutes long when played beginning to end in a linear fashion, but it could also contain thirty minutes of interactive content.

3. Searching

The search methodology of some embodiments of the invention is based on a series of techniques for normalizing structured data found on web pages or within strings of text via a set of rules governing the assignment of multimedia properties to the terms and phrases, based upon a semantic understanding of the same.

Upon input of a keyword or set of keywords into the search engine, information matches can be evaluated by searching a series of data sources with publicly addressable API's selected by human editors, public data, vendor private data, and data refined by the system of example embodiments of the invention. Typically, each source represents a specific vertical of information (e.g., Wikipedia for general knowledge or Yelp & Citysearch for restaurants).

Figure 6:
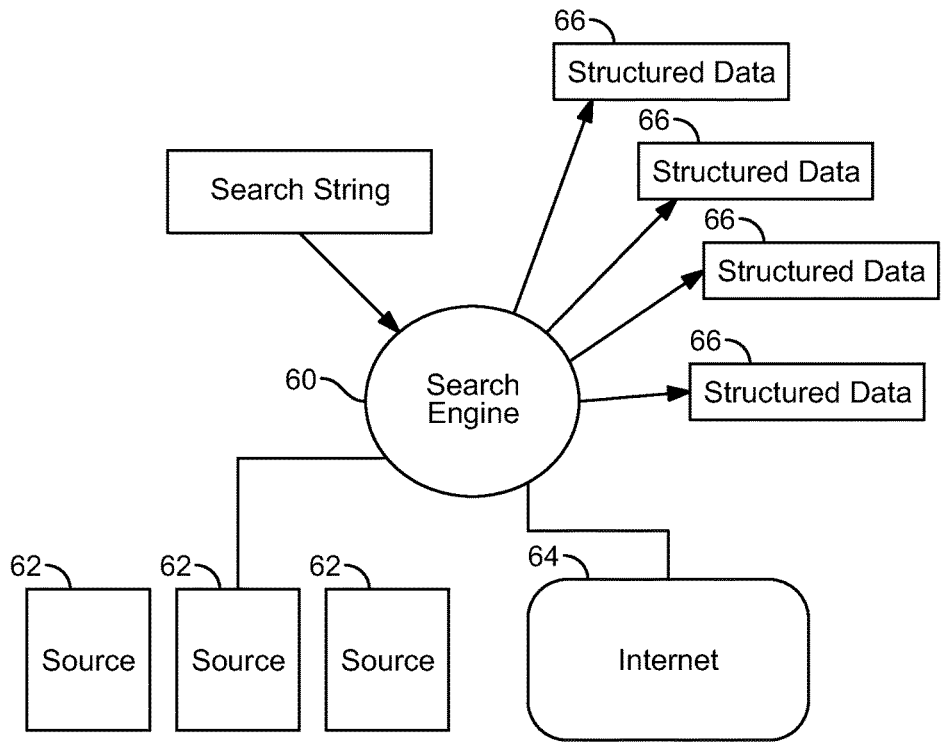
FIG. 6 is a block/flow diagram showing an illustrative search engine consistent with one or more aspects related to the innovations herein.

If no exact matches are found within the pre-selected data sources, the search engine can search the web or other databases at large, retrieving structured sets of data corresponding to the thirteen default scene types set forth above (Images, Timelines, Dates, Ratings, etc.) from web pages or databases identified as a match for the keywords input. FIG. 6 depicts such a search with structured data 66 being retrieved from data sources 62. In FIG. 6, wherever the search engine 60 finds a match, a link to the original data source 62 is included when the information is presented to the user. In this example, the information is presented via the Internet 64. For exemplary purposes, FIG. 6 shows three data sources 62 and four sets of structured data 66.

In some embodiments, the search engine extracts and stores any data it recognizes to a temporary data warehouse, enabling the next step of animating coherent search results: normalization.

1. Multimedia Normalization Via Structured Data Analysis

Via careful analysis of each piece of data extracted from structured data sources or free-form web pages, the presentation engine generates a short 1-3 second animation presenting the key pieces of information contained within the data, complemented by a set of internal processes to augment the data in whatever method necessary. The animation length can vary within the scope of the invention, including being less than 1 second more than 3 seconds in length, for example.

Figure 7:
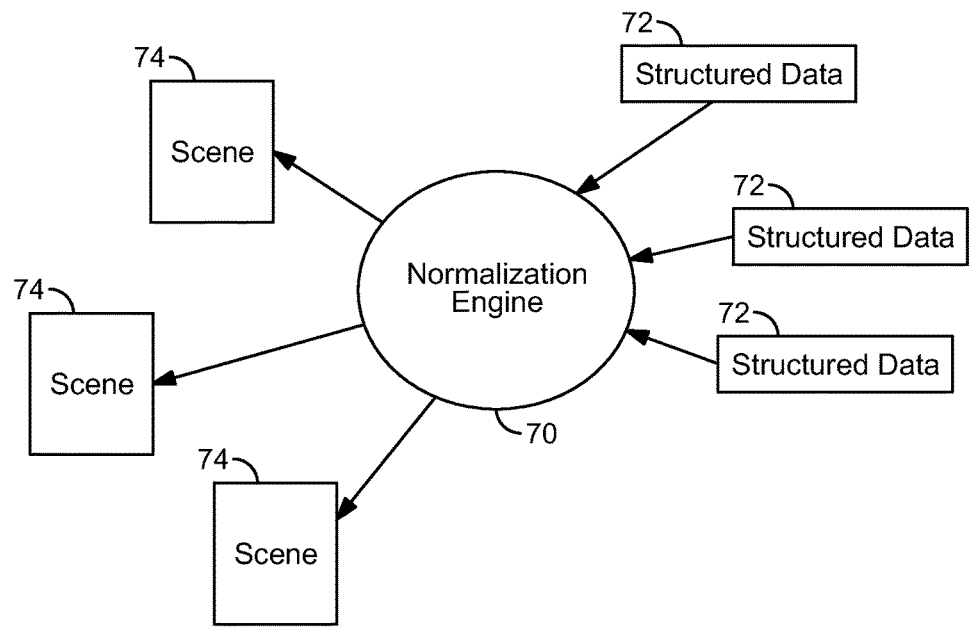
FIG. 7 is a block/flow diagram showing an illustrative normalization engine consistent with one or more aspects related to the innovations herein.

FIG. 7 depicts a normalization engine 70 performing this normalization process. This process of analyzing each piece of data, identifying its component parts, recognizing the nature of each part, and assigning an value or identity to each part, is known as "normalization." In FIG. 7, the normalization engine 70 receives structured data 72 (in this example, three sets of structured data 72), analyzes this data to its component parts and assign values to it, and outputs the normalized data to scenes 74 (here, three scenes 74 are depicted).

For example, a piece of structured data from a Citysearch web page identifying a quality rating on a local business can appear as follows (extracted from the Citysearch.com web site):

<span class="big_stars rating"><img
src="http:/images.citysearchnet/assets/guide/images/star-Jating_sprites.gif"
class="average stars_9" alt-"4.5 Star Rating: Recommended" title-"4.5 Star Rating: Recommended"></span><span class="reviewCount">

This string can be analyzed to extract its component parts—in this case, the range of the quality rating and this particular business' value on this scale—and rewritten in an XML markup (or other language) to prepare the data governing playback of the animation. The following shows one exemplary structure governing playback of the animation:

<rating animation_id-"1">
<label fonCcolor=$^{1tFF6600"}$font_size="14">4.5 Star Rating: Recommended</label>
<range>5</range>
<value>4.5<1value>
<defaultJating>http://images.citysearch.net/assets/guide/images/starJating_sprites.gif</defaul t_rating>
<full_rating></fullJating>
<half rating-c/half rating>
<emptyJating></empty_rating>
<1rating>

This normalization process can occur for every piece of data recognized as a match for the given keyword.

After translating the data into XML (or a different language), the presentation engine may generate and store each recognized piece of data within a temporary data warehouse, for later prioritization and potential presentation by the engine.

2. Multimedia Normalization Via Free-Form Strings

In addition to the dynamic creation of multimedia XML-defined "scenes" in response to a search query, the presentation engine is able to generate multimedia for any set of strings submitted by users or publishers. Through this process, the presentation engine can generate a compelling animation describing individual topics, daily activities, or for any other purpose suited to the description in a few lines of text to a paragraph of text (such as, for example, 100-300 characters of text).

In this case, the presentation engine can apply the same normalization schema within a block of text as to structured data sources, analyzing and extracting recognized data types from the string upon submission to the engine.

For example, the following text contains four data types recognized by the presentation engine: "10/9/07: Ate at Landmarc Restaurant in New York City. *** The burger was a little overcooked.

1019107 is recognized and stored as a Qwiki date type

Landmarc Restaurant in New York City is recognized and stored as a mapped location ¥*** is recognized and stored as a star quality rating.

Each sentence of text is recognized and stored as text to be animated

Any images/media uploaded or appended are recognized as such.

The string therefore generates the following XML, as an example:

```
<template type-"O" duration-"2" transitionjnitialjde"1" transition_final_id-"1" click_url>""><date animation id-"1 t1>
    .<title font color-"FF6600" font size-"14"></title>
    <value>2007-09-1 O</value>
    <era>AD</era>
    <description font_color-"0085B8" font_size-"12"></description>
    <image/>
</zdate>
<map animationj d>"I" width-"300" height-"300">
    <lat>40.714269</lat>
    <long>-74.005973</long>
    <title font color-"FF6600" font size-"14"></title>
    <address font_color-"0085B8" font_size="12">New York City</address>
</map>
<rating animation 1">
    <label font_color="FF6600" font_size="14">4.5 Star Rating: Recommended</label>
    <range>5</range>
    <value>4.5</value>
    <defaultrating>http://images.citysearch.net/assets/guide/images/starsprites.gif</default_rating>
<full_rating></full_rating><half;ratinge-c/half:rating><emptyJating></empty_rating></rating>
    <text animation_id="1" background_color"OOOOOO" pos.1_x-"200" pos 10">
    <title font color-"FF6600" font size-"14">Landmarc</title>
    <body font_color-"0085B8" font_size="12">Ate at Landmarc Restaurant in New York City.
The burger was a little overcooked.</body>
    </text>
</template>
```

In an identical process to assembling search results, after translating the data into XML, the presentation engine can generate and store each recognized piece of data within a: temporary data warehouse, for later prioritization and potential presentation by the engine.

3. Narrative Extraction

In an example embodiment, a core piece of the multimedia experience involving a string of descriptive text or search results involves a narrator describing on-screen action. The presentation engine integrates text-to-speech software (which can, for example, be third-party software) coordinated with the contents of the generated animation to present a cohesive narration complementing the information presented within the player.

Figure 8:
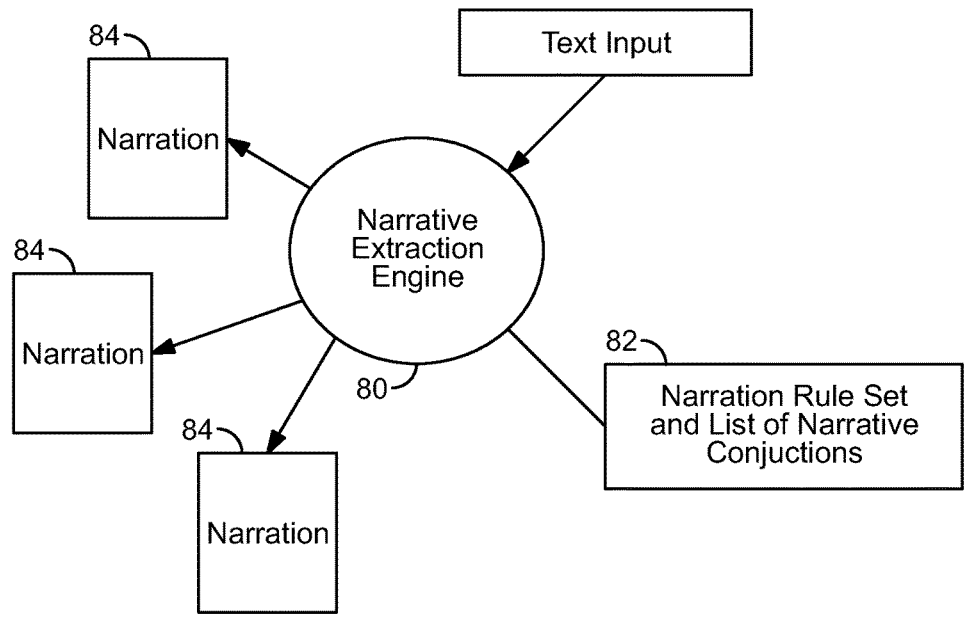
FIG. 8 is a block/flow diagram showing an illustrative extraction engine consistent with one or more aspects related to the innovations herein.

In order to provide accurate narration, in one embodiment, a narrative paragraph that matches the data presented within the visuals needs to be identified from source data, whether this data is a pre-selected source or the web .at large. FIG. 8 sets forth one embodiment of a narrative extraction engine 80. In this embodiment, the narrative extraction engine 80 applies a set of narration rules 82, which can include narrative conjunctions, to identify text that can complement on-screen media as a narration 84.

As an example, this narration process can include the identification of a narrative conjunctor—a", "was a", "has been" etc., or identification of sources containing narrative signifying words in their titles and/or META tags such as "bio" or "profile", to extract and properly identify any text that can complement on-screen media as narration. An example of the narrative conjunction identification process, which is an example only, is demonstrated in the below text describing an executive from a television studio found via a web search for "Barry Meyer":

http:/www.timewarner.com/corp/management/executives by business/warner bros/bioi meyer barry.html
    Title: "Time Warner—Barry M Meyer"
    Meta description: "Bio of Barry M Meyer . . . "
    Narration Excerpted:
    Barry M Meyer, one of the most respected executives in the entertainment industry, became Chairman & Chief Executive Officer of Warner Bros. on Oct. 4, 1999 after having served as the Studio's Executive Vice President & Chief Operating Officer since April 1994 . . . .

If multiple narrations are identified, the presentation engine may perform string analysis to determine the narrative text that contains the most similar number terms of all the matches, ultimately selecting the most comprehensive narrative available.

D. Music Selection

In some embodiments, the primary method of selecting the music to accompany an animation can occur by analyzing the narrative description that has been selected to accompany the presentation and searching for one of 3,000 keywords (mapped to 1,000,000+synonyms) representing the many thousands of tracks that may be licensed from commercial music providers for inclusion in animations.

Each track ingested into the audio engine can include a category and time period that describes its pacing, tempo, and audio "character". These tags can be recorded by human editors who manually evaluate each piece of music.

In some embodiments, sound effects may also be prepared and dynamically presented to coincide with the type and amount of on-screen data (i.e., a text scene with a high number of characters visible will generate a longer "typing" sound effect than one with a fewer number of characters).

Figure 9:
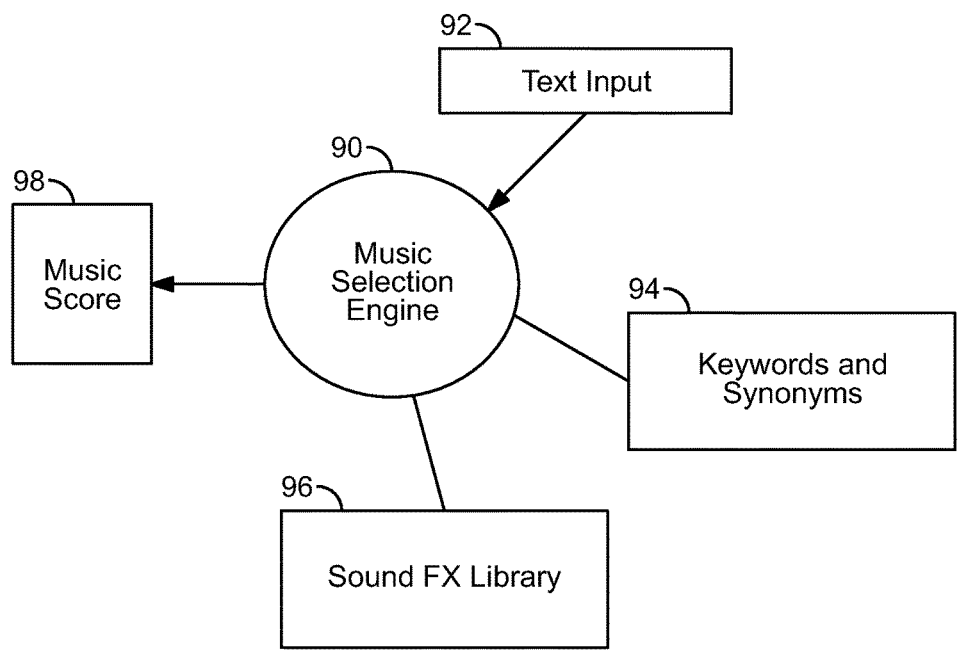
FIG. 9 is a block/flow diagram showing an illustrative selection engine consistent with one or more aspects related to the innovations herein.

FIG. 9 depicts one embodiment of a music selection engine 90. In this embodiment, the music selection engine 90 receives a text input 92, uses keywords and synonyms 94 to search through the text input 92 for matches, and then uses a sound library 96 to find matching music or sound for the scene. A music score 98 can result from this process using the music selection engine 90.

Animation Assembly & Prioritization

After all the scenes have been generated via analysis of text or search sources, the presentation engine can evaluate and assign a quality rating to each data type based upon the information contained within, and information concerning where the data was sourced from.

The data types can then be assembled into an animation in order of their quality rating, per the following rules, which can be used in one embodiment of the invention:

Each data type has a default score:
    Images & Video: 12
    Addresses & Maps: 1
    Bulleted lists of text: 6, +1 for each bullet
    Dates: 9
    Timelines: 8
    Quality ratings ("5 stars"): 7
    Line graphs: 6
    Pie charts: 5
    Range: 4
    Yes/no Data Point: 2
    Internet URL: 3
    Standard strings of text: 1

The default scores may be modified per the following rules and additional rules developed based upon human input and machine learning techniques:

Data types with manual input are assigned +1 points for each manual edit committed Images sourced from thumbnails within web pages receive +1 points Images within captions receive +1 points Text based on capitalized multi-word phrases linked within source data accompanied by an image receive +2 points Text based on terms linked within source data receive +1 points Text based on un-capitalized linked terms receives −1 points In some embodiments, once the data types are assembled in descending order according to their score, the following rules (and additional rules developed upon human input and machine learning techniques) can be used to prioritize the maximum 14 scenes to include:

Maintaining a 1:1 ratio of image or media types to non-image or media types

An image must always start the animation

If possible, scenes of the same data type can never play back-to-back

Text scenes that repeat more than 80% of narration are discarded

All scenes receive a calculated amount of on-screen time depending on the length of their contents, established via character counts or size of images, with 1 second per 100 characters or 100 pixels.

Figure 10:
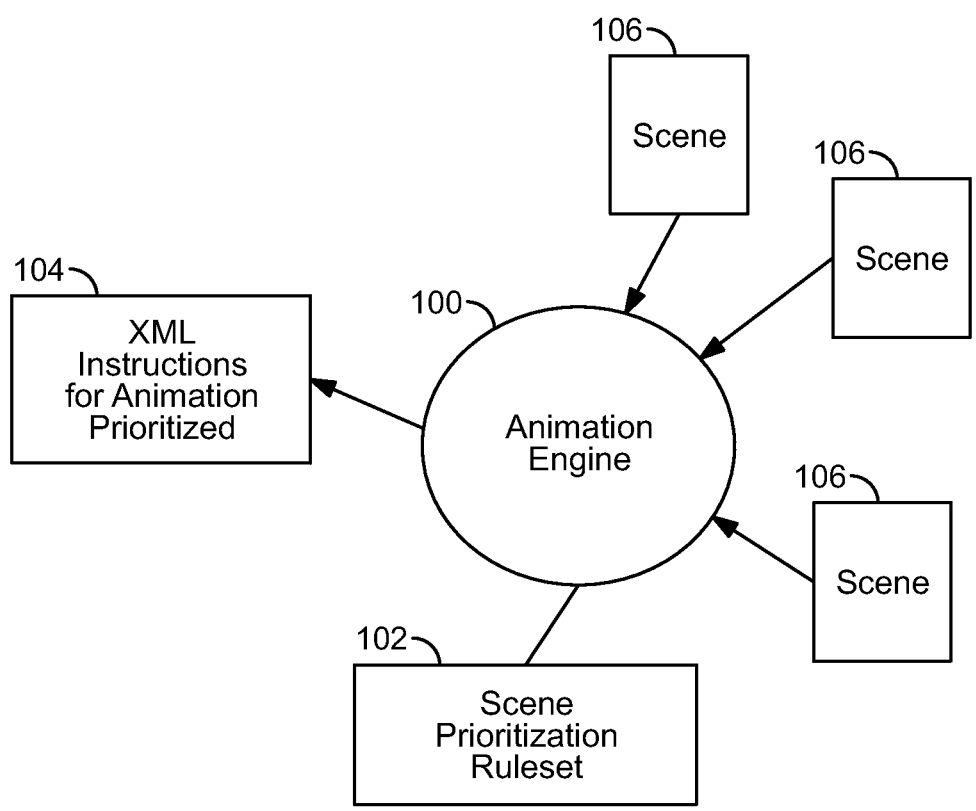
FIG. 10 is a block/flow diagram showing an illustrative animation engine consistent with one or more aspects related to the innovations herein.

The application of these rules allows the presentation engine to generate an XML file closely corresponding to the input, which is then interpreted by the presentation engine and displayed to the user in the manner consistent with the animation practices described in the first section of this application. FIG. 10 sets forth one embodiment of an animation engine 100 combined with a scene prioritization ruleset 102 and XML instructions for animation prioritization 104. The animation engine 100 and ruleset 102 can organize the scenes 106 for animation prioritization 104.

The methodology set forth above is one way of determining what information to include, but other methods can also be used within the scope of the invention.

According to some implementations herein, the presentation engine accepts input comprising passages of text or any alphanumeric string (or set of strings) or queries selected from pull-down menus or selected text on screen. In response, it assembles short (1 minute or less) animated presentations defining (or corresponding to) the semantic meaning of the input. Each animation includes a dynamically rendered set of multimedia "scenes" created on the fly. Other embodiments are also within the scope of the inventions.

The components set forth above can be combined to form one system according to an embodiment of the invention. In this embodiment, for instance, the system can include a query interface to accept at least one input keyword relating to a subject for the animation, a database having a set of at least two templates, a searching engine to retrieve data from a plurality of web sites dynamically, a runtime engine to determine which data to assemble into the set of templates, and an animation engine to present the animation for playback to the user. The runtime engine can include, for example, the normalization engine, extraction engine, and selection engine set forth above. In addition, the presentation engine according to one embodiment of the invention can include each of the query interface, the database, the normalization engine, extraction engine, selection engine, and the animation engine.

Additional example embodiments of systems and methods for generation and display of presentations will now be described. In an example embodiment, a hosted web service may be provided on a server system connected to the Internet or other communications network. The server system may assemble and provide multimedia presentations to client devices based on keywords or other input from users.

In an example embodiment a presentation may be described by a file that has the text to be spoken, the visual elements to be displayed, and the logical relationships between the two to allow proper sequencing. In example embodiments, even though the presentation is a precisely timed succession of events, there is no need for the user to supply any timing. Furthermore, in example embodiments, the processing may retrieve additional supporting material from recognizing references to known entities and produce a presentation significantly richer in graphics and pictures than the user specification.

In example embodiments, the presentations may include a narration that is generated from articles or other descriptions regarding an entity, such as a person, location or other topic. In example embodiments, the narration may be provided as an audio media object that plays spoken words corresponding to the text of the narration and may be generated in advance or dynamically, on the fly, by text-to-speech software. In example embodiments, additional media objects may be associated with portions of the narration and may be displayed, played or highlighted during the respective portion of the narration. For example, images related to an entity discussed in the narration may be displayed during the portion of the narration that mentions those entities. In one example, "Barack Obama" may be typed into the search engine. Here, for example, the name may be translated into a picture of him along with a video of a speech he gave. In example embodiments, media objects may also be generated from data in the narration or from other sources of data to generate additional media objects to be displayed or played in association with the narration. For example, in some embodiments, animations may be generated based on data extracted from the narration and may be displayed when that information is discussed in the narration. For example, a map animation may be generated to zoom in on the coordinates of a location and a timeline animation may be generated based on the birth dates and death dates of a person. In example embodiments, the sub-category of the location entity (for example, continent, country, state, county or city) may be used to determine how far to zoom in on the map for the animation. In other examples, media objects, such as animations, may be dynamically generated to illustrate real-time information such as the weather or current time at a particular location or other dynamically changing information relating to an entity. In example embodiments, the linking of media objects with the narration may be used to provide an audiovisual summary or overview of information regarding an entity from a variety of sources. Further, the various multimedia assets may be placed in time at the hand of the human creator, or automatically. The sources may be from domains or publishers different than the provider of the web-based presentation service, and may include search engines, online encyclopedias, databases and other data collections available over the Internet or from other sources. In an example embodiment, each of the media objects in the presentation may be selected by the user to locate the original source of the data and, as a result, the presentation may provide a useful way to index and locate sources of information on the Internet relating to a particular topic, including text, images and other multimedia objects. The coordination of the narrator with visual media may also involve innovative aspects of the Qwiki technology, allowing a human to create an interactive, multimedia presentation. The Qwiki author may record their own narration or source it from the internet, but this allows the author to build a narrative, audio-visual story.

Figure 11:
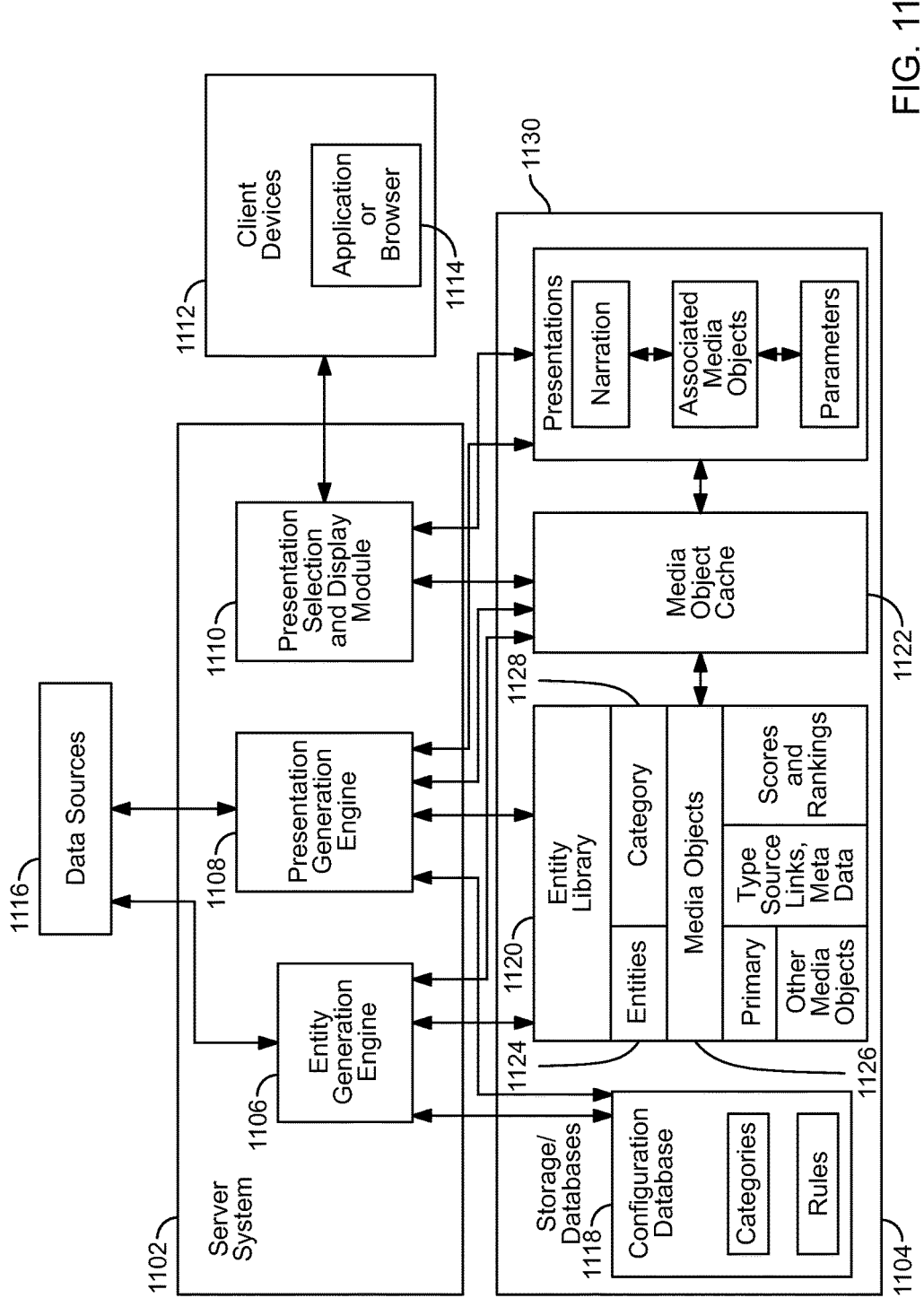
FIG. 11 is a block/flow diagram showing an illustrative server system consistent with one or more aspects related to the innovations herein.

In example implementations, presentations for millions of different entities may be automatically generated from these data sources. As shown in FIG. 11, an example implementation may include a server system 1102 associated with storage 1104 containing various databases. The server system may include one or more servers associated with a domain or application service provider. The server system 1102 may include computer program modules that may be executed by one or more processors on the server system 1102 to implement processes to assemble and display presentations. In an example implementation, the computer program modules may include an entity generation engine 1106 to generate entities and collect associated media objects for use in presentations, a presentation engine 1108 to generate a presentation for each entity, including a narration and associated media objects, and a presentation selection and display module 1110 to receive input from a client device 1112 and provide a presentation in response to the input for display on client devices 1112. In other implementations, these computer program modules may include the presentation engine 20 (FIG. 2), search engine 60 (FIG. 6), normalization engine 70 (FIG. 7), narration extraction engine 80 (FIG. 8), music selection engine 90 (Figure (and/or animation engine 100 (FIG. 10) described above.

Client devices may communicate with the server system 1102 over the Internet or wireless networks or other networks. The client devices 1112 may include a browser or other software application 1114 for interacting with the server system 1102 and for displaying the presentation.

In an example implementation, the entity generation engine 1106 may include computer program instructions for generating entities and collecting associated media objects. Entity generation engine 1106 may obtain data for generating entities and media objects from data sources. 1116. In example implementations, the data sources may include a variety of web sites, search engines, databases and data collections available over the Internet or other network. In some implementations, some or all of the data sources 1116 may be from different publishers or domains. In some example implementations, the data sources may also include data collections associated with server system 1102, including databases and data collections stored in storage 1104. In the example implementation of FIG. 11, storage 1104 may include a configuration database 1118 that may contain categories of entities that may be generated or recognized by server system 1102 and/or rules that may be used by entity generation engine 1106 for generating entities and by presentation generation engine 1108 to generate presentations. For example, templates and rules for generating presentations described above in connection with FIGS. 1-10 may also be included in configuration database 1118 in example implementations.

In example implementations, storage 1104 may also include an entity library 1120 for storing data regarding entities 1124 generated by entity generation engine 1106 and for associating media objects 1126 with those entities. The entity 1124 may also be associated with a category 1128 corresponding to a category in the configuration database 1118. In some example implementations, the media objects 1126 may be images, video clips, animations, other multimedia objects, and/or combinations thereof that can be displayed or played back as part of a presentation. In some example implementations, the media objects 1126 may include any or all of the scenes and data types described in connection with FIGS. 1-10 above, including strings of text, bulleted lists of text, images, video clips, dates, quality ratings, addresses, graphs, charts, timelines, ranges, Internet URLs, yes/no data points, or animations based on any of the foregoing. In example implementations, the media objects may be represented by links to the media objects themselves, which may be stored elsewhere. The entity library may also include other data regarding each media object 1126 associated with an entity 1124. For example, the type, source, link, and other meta data may be stored. Meta data may include a caption for an image or other meta data about the media object. The meta data may also include data about the quality, resolution, size or length of the media object. A score or ranking for each media object may also be included. Scores may be based on any of the scoring criteria described above or other scoring or quality criteria. In example implementations, the entity library 1120 may also identify a primary media object to be displayed for each entity. In example implementations, the primary media object may be an iconic image associated with the entity. This image may be used as an icon for a presentation on the respective entity or as an image to display when presentations regarding other entities refer to the respective entity.

In some implementations, the media objects may be loaded and stored in the storage, for example in media object cache 1122. In example implementations, animations for certain types of data associated with an entity may also be generated and stored in the media object cache 1122. The entity library may include links to the media object in media object cache or links to the media objects stored on data sources 1116.

For example, the system described in FIG. 11 may be constructed and arranged to receive input relating to a subject for a presentation; select one of a plurality of automatically generated presentations corresponding to the input; and return the selected presentation. The system described in FIG. 11 may generate each of the plurality of automatically generated presentations by selecting an entity as a subject of the presentation from among a plurality of entities, generating a narrative for the selected entity, and selecting at least one media object associated with the entity. This process is described in greater detail below with respect to FIGS. 12-19. Additional features associated with or involving aspects of FIG. 11 are set forth in the attached appendix at, inter alia, the "QLib_entities" section, and the QLib_output section starting on line 215.

Figure 12:
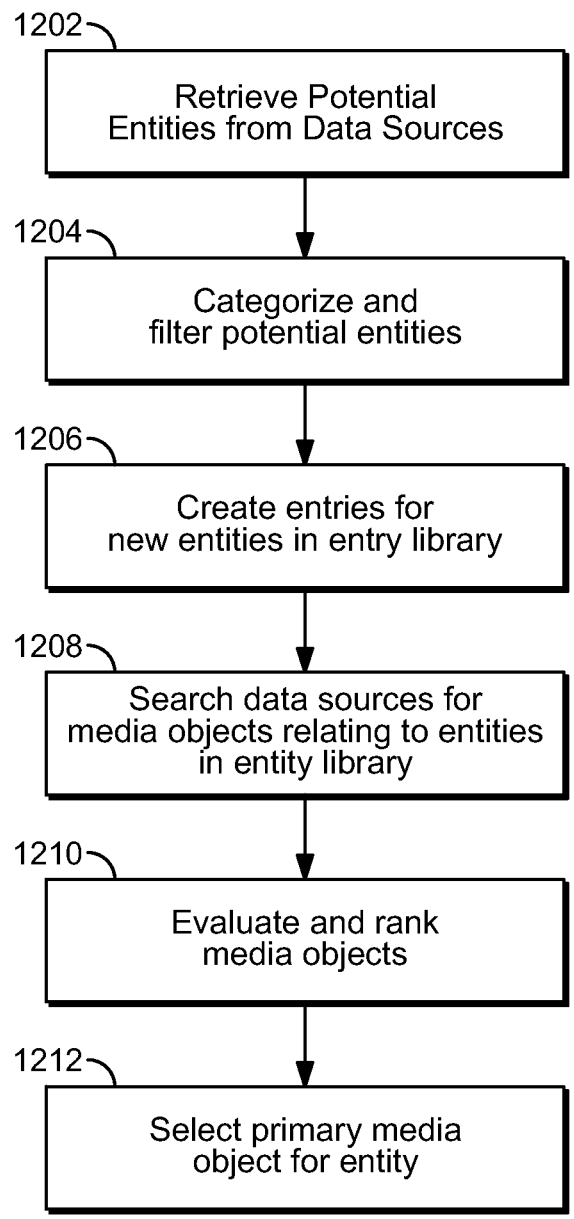
FIG. 12 is a flow diagram showing exemplary features of illustrative methods of generating entities consistent with one or more aspects related to the innovations herein.

FIG. 12 is a flow chart of a method for generating entities according to an example implementation. The method shown in FIG. 12 may be implemented by the entity generation engine 1106 in an example implementation. For example, this method may comprise generating at least one of the plurality of entities by receiving data associated with an entity that is a potential subject of the presentation; categorizing the entity in at least one of a plurality of media categories; storing the entity in an entity library; identifying at least one media object relating to the entity; ranking the at least one media object; and selecting one of the at least one media objects as a primary media object for the entity. This is described in greater detail below.

As shown at step 1202 in FIG. 12, the entity generation engine 1106 may retrieve lists or other data identifying potential entities. In example implementations, the entity generation engine 1106 may search or download information regarding potential entities from one or more data sources 1116. The data sources used to identify entities in example implementations may include entries or article titles from an on-line encyclopedia, database or other data collection, lists of people, locations or topics from on-line directories, lists of media (books, music, plays, movies, or other media) from on-line databases or online vendors of media, lists of products from online vendors (such as Amazon.com), lists of actors and movies from movie databases, search results from online search engines, and other reference sources. In an example implementation, one or more data sources with publicly addressable application programming interfaces (API's) may be used as a primary reference for identifying potential entities. For example, one or more sources with coverage over the categories or types of information of interest may be used as the primary reference source(s) for identifying potential entities (e.g., Wikipedia for general knowledge or Yelp and Citysearch for restaurants).

As shown at step 1204 in FIG. 12, the potential entities are categorized and filtered based on the classifications and rules in the configuration database 1118. In example implementations, the configuration database 1118 may include categories for entities, such as person, location, media, living things, man-made things, abstract concepts, medical, companies, associations, events, lists, or other categories. Each category may also have sub-categories. For example, the category of persons may have sub-categories of actor, athlete, character, artist, politician, and/or other; the category of media may have sub-categories of media, book, movie, music, and/or television, and the category of location may have sub-categories of continent, country, state, county, city, and/or school. The rules in configuration database 1118 may include criteria for determining whether to include a potential entity in the entity library 1120. For example, entries in an online database that are lists of topics or disaggregation pages may be filtered out. In one example implementation, titles of articles directed at a single topic may be selected as potential entities to add to the entity library. In some implementations, potential entities that correspond to selected categories may be filtered out. Entity generation engine 1106 may categorize potential entities based on the source from which they are obtained (e.g., a list of persons from a database of movie actors may be categorized in the category person with sub-category actor) and/or may evaluate data regarding the potential entity from the source to determine a category and/or subcategory. For example, certain types of information or keywords in an online article may be used to categorize the entity. For example, keywords regarding birth date and death date in the article may be used to categorize the entity as a person. Also, in some implementations, the data sources may include structured data elements that may vary depending on the topic of an article and may be used to categorize the entity corresponding to that article. For example, an article or database entry that includes map coordinates may be categorized as a location.

As shown at step 1206 in FIG. 12, once the potential entities have been categorized and filtered, the entity generation engine 1106 may use the remaining entities to create or update entries in the entity library 1120. The entity library may include an entry in a database or other data collection for each entity. The database record or data structure used for the entity library 1120 may associate the entity with its corresponding category and sub-category as well as a number of media objects associated with the entity. The entity library may also identify alternative names or shortened or alternative versions of names for the entity and store them in the entity library in association with the entry for the respective entity. For example, an entity for "William Jefferson Clinton" might also be identified by the name "Bill Clinton".

As shown at step 1208 in FIG. 12, the entity generation engine 1106 may search the data sources 1116 for media objects related to the entity. The data sources used for identifying objects for the entity may include the primary reference source(s) used to identify the entities (such as an online encyclopedia, database or directory) and may also include additional data sources in example implementations (such as images from an image search engine or online image database). In an example implementation, media objects linked or included in the primary reference source(s) may be included in the entity library. For example, images that are included or linked in an online article describing the entity may be included. In some implementations, links, footnotes or other references may be followed recursively to identify other media objects related to the entity. In example implementations, two, three, or four levels of recursion may be searched. In some example implementations, only data sources that have been identified as trusted or high quality may be used to retrieve media objects (for example, by being included in a list of approved data sources in the configuration database 1118). For each media object, the entity library may include some or all of the following information: the type (for example, video clip, image, sound clip, graphic, or other data type) may be indicated based on the format or file extension associated with the media object, the source of the media object (which may include the location within an article where a media object was included, referenced, or linked) and other meta data associated with the media object (for example, a caption associated with an image, attribution, the size or resolution of the media object, or other data regarding the media object). These are examples only. In other implementations, other information may be generated and stored regarding the media objects. In some example implementations, the media objects may not be stored in the entity library 1120. For example, media objects may be stored in a media object cache 1122 and a link or other association with the media object may be stored in the entity library. In some implementations, the type, source, meta data, and/or other information regarding the media object may also be stored in the media object cache 1122 instead of the entity library 1120. In example implementations, the entity library 1120 or media object cache 1122 may not include the content of the media object (e.g., the image or video clip) or may only include a portion of the content (e.g., a 1-3 second video clip from a larger video) and may include a link to the content on one of the data sources 1116 from which the content can be retrieved.

As shown at step 1210 in FIG. 12, the entity generation engine 1106 may evaluate, score, and/or rank the media objects associated with an entity. For example, duplicate media objects may be discarded. Duplicate media objects may be, for example, the same image retrieved from two different data sources or the like. In example implementations, the higher quality image or image from a data source with a higher priority may be retained as specified by the rules in the configuration database 1118. In an example implementation, the rules in the configuration database 1118 may also include criteria for scoring or rating media objects for entities within particular categories or media objects of a particular type. In an example implementation, a media object that is an image may be scored based on its resolution, size, orientation, and/or the source from which it is obtained (and the location within that source). For example, the first image returned from an image search engine for an entity may be scored higher than an image that is lower in the search results. In addition, an image linked or included in the beginning of an article (for example, in or adjacent to the first paragraph) may be ranked more highly than an image at a different location.

As shown at step 1212, the entity generation engine 1106 may then select a primary media object for each entity. In an example implementation, the primary media object may be an image associated with the entity with the highest score, which may be referred to as the iconic image for the entity. The iconic image may be displayed as an icon for a presentation regarding the entity and may also be displayed in other presentations when referencing the entity.

The method described in FIG. 12 may be used to generate entries for millions of entities in the entity library 1120. In example implementations, some or all of the steps in the method shown in FIG. 12 may be repeated on a regular basis, such as daily or weekly, to update the entity library 1120 and/or media object cache 1122 to correspond to the most recent information available from the data sources 1116. In implementations, some of the data sources may not be able to support constant download of their content, so an update mechanism may be implemented based on current events. In example implementations, only elements that are expected to have changed according to daily news may be fetched and merged back in the entity library 1120 and presentation database 1130. For the rest of the presentations, only the links to the updated entities and presentations may be refreshed in an example implementation. Additional features associated with or involving aspects of FIG. 12 are set forth in the attached appendix at, inter alia, the QLib_output section starting with line 452.

In example implementations, the presentation generation engine 1108 may then generate presentations for each of the entities using the entities and media objects in the entity library 1120. In some implementations, the entity generation engine and presentation generation engine may be combined in a software application that crawls and searches the data sources and generates entities and presentations for each entity at the same time. In other example implementations, the entity library may be populated by the entity generation engine 1106 and the presentation generation engine 1108 may separately generate presentations for those entities.

In some example implementations, the presentation generation engine 1108 may implement the functionality of the normalization engine 70 (FIG. 7) and narrative extraction engine 80 (FIG. 8) to generate a "narrative for the presentation and the functionality of animation engine 100 (FIG. 10) to associate media objects (which may include scenes as described above) with the narrative for the presentation. The resulting presentations may be stored as presentation description files using the syntax of a data description language such as XML or JSON which may specify which media objects are to be displayed during the narration and how they are to be displayed. The presentation description files may be stored in a presentation database 1130 or other data collection and may be indexed by the name of the entity and its aliases.

In an example implementation, a presentation description file may include a header with general parameters, text to be spoken for the narrative, media objects to be displayed or played during the presentation such as pictures, videos, links with iconic images, animations or other visual elements, and bindings between media objects and text in the narration that specify what media objects to display or highlight when a portion of the narration is being spoken. There may also be multiple data types that have named parameters to be resolved at play time, instead of actual values known at processing time when the presentation description file is generated. For example, a weather animation data type may reference the temperature at the user location, and an entertainment highlights data type may reference the movie poster of the current show at the local theater. The script for these data types may cause the dynamic, real-time values for the variables to be retrieved from a data source 1116 for display on the client device at runtime. Accordingly, presentations may be light to load and easily updated because of the markup definition, method of defining animation in text, and inclusion of real time data as described above. Furthermore, presentations that are light to load may be easily adaptable to multiple display platforms.

The following is an example of elements of a presentation description language based on JSON syntax. This is an example only and other languages or scripts may be used to describe a presentation.

A header that contains general parameters:
{"qdl": {"title": "Ansel Adams", "author": "qwiki_inc", "lang": "en", "viewable_by": "all", "class": "Person", "class2": "Actor", Text to be spoken:
"sentence_0": {"type": "sentence", "rank": 0, "text": "Ansel Easton Adams (Feb. 20, 1902 Apr. 22, 1984) was an American photographer and environmentalist, best known for his black-and-white photographs of the American West, especially in Yosemite National Park."} "sentence I": {"type":..
"sentence_2": {"type":..

Visual elements, picture, videos, links with iconic images, animations "global_image_0" ("type": "image", "url": "http://upload.wikipedia.org/wikipedia-icommons/0/05/Ansel_Adams_andcamera.jpg", "title":" ", "source": "http://commons.wikimedia.org/wikiFile: Ansel_Adams_and camera.jpg" }), "link_I": {"type": "qwiki", "title": "Edward Weston", "link_url": "http://en.wikipedia.orglwikilEdward_Weston", "icon_url": "http://upload.wikimedia.orglwikipediaien/2/2e/ WestonI923.jpg", "imgpage source": "http://en.wikipedia.org/wikilFile:Weston923.jpg",}, "timeline_O": {"type" "timeline", "title": "Ansel Adams", "Born": {"event": "Born", "textI: "February "text2": "1902", "val": "1902", "pin": 1, "detail" 0, "source": "Wikipedia" }, "Died" {"event": "Died", "text1": "April 22", "text2": "1984", "val": "1984", "pin'!: 2, "detail": 0, "source": "Wikipedia" }, at Death": {"event": "Age at Death", "text!": " ", "text2": "82", "val": "82", "pin'": 0, "detail": 0, "source": "Wikipedia"}}, Bindings between visual elements and text:
"binding_9": ({"type": "binding", "ref": "link_1", "from_sent": "sentence_4", "from_pos": 52, "to_sent": "sentence_4", "to_pos": 52}, In an example implementation, the presentation generation engine 1108 may assemble a presentation description file around a narration. In an example implementation, the narration may be generated from one or more primary reference sources selected from the data sources 1116. For example, one or more sources with articles or other textual descriptions of entities within one or more categories may be used as the primary reference source(s) for generating the narrative (e.g., Wikipedia for general knowledge or Yelp and Citysearch for restaurants). In some example implementations, more than one data source 1116 may be used to generate the narration for an entity. In one example implementation, articles from an online encyclopedia are used to generate narratives for entities described in the articles.

Figure 13:
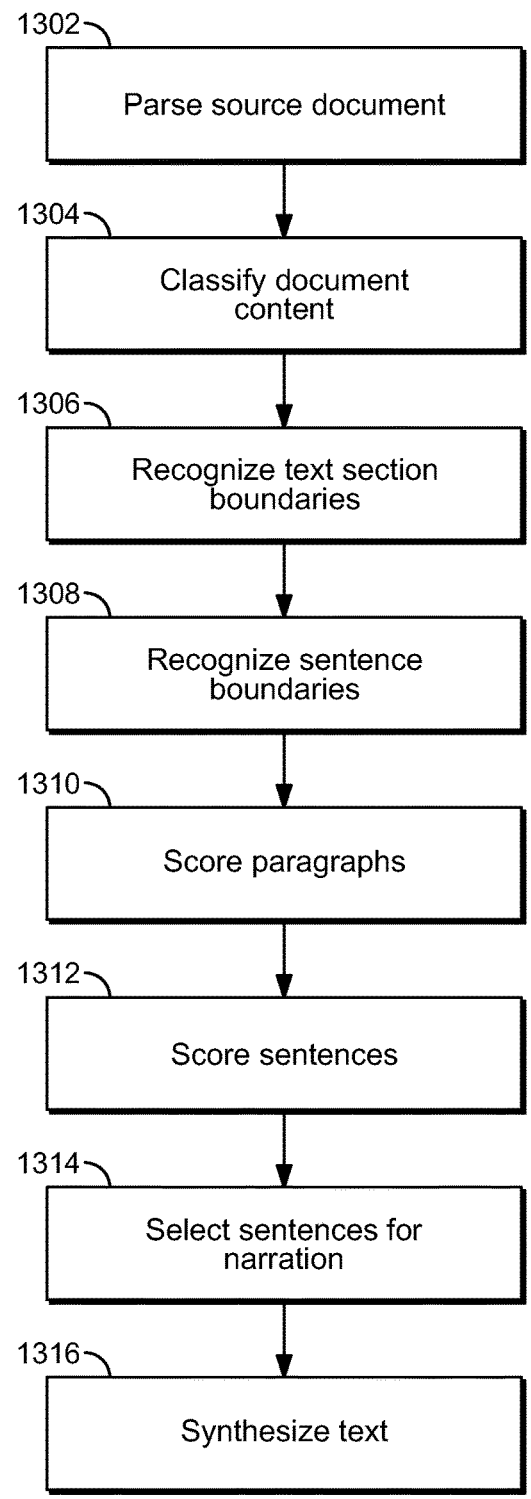
FIG. 13 is a flow diagram showing exemplary features of illustrative methods of generating a narration for a presentation consistent with one or more aspects related to the innovations herein.

FIG. 13 is a flow chart showing a method for generating a narrative for an entity in accordance with an example implementation. In an example implementation, this method may be implemented by presentation generation engine 1108. For example, this method may comprise selecting a data source as a primary reference source for generating a narrative for the entity; receiving a source document associated with the entity from the selected data source; parsing the source document; classifying the parsed contents of the source document; defining at least one text section by identifying text section boundaries in the source document; scoring the at least one identified text section in the document based on content and/or position of the at least one identified text section; and selecting at least one of the at least one scored text sections to be added to a narration, the selecting based on a score of the at least one of the at least one scored text sections. This is described in greater detail below.

As shown at step 1302 in FIG. 13, the presentation generation engine may parse the source document retrieved from a data source 1116 that has been selected as a primary reference source for generating a narrative for an entity. In an example implementation, the source document may be an article describing the entity. As shown at step 1304 in FIG. 13, the presentation generation engine may then classify document content based on metadata and/or title keyword matching ("life of", "geography . . . ). As shown at step 1306, the presentation engine may recognize text section boundaries in the source document if applicable. For example, section headers and paragraph boundaries may be identified by the presentation generation engine. In example implementations, some structured data elements may be recognized and discarded or ignored when generating the narration. For example the following may be examples of data elements that may be ignored when generating a narration: lists, cross-references such as "see also", bibliography, notes, introductory quotes, and/or macros. For example, some data sources may use macros to generate additional data that may be removed or ignored for purposes of generating a spoken narrative. For example, a macro that converts a distance or measurement to display both U.S. customary units and metric measurements may be ignored and only one measurement may be included in the narration. The above are examples only and other implementations may filter other data types.

As shown at step 1308, the presentation generation engine may also recognize sentence boundaries (for example, based on initial capitalization and punctuation terminating the sentence). The presentation generation engine may take care of many special cases involving a period followed by a capital letter (abbreviations, middle names, initials, trademarks . . . ) that should not be recognized as a sentence. In some example implementations, non-terminated sentences may be ignored.

As shown at step 1310, the presentation generation engine may then score each paragraph that has been recognized in the data source (excluding ignored data elements). In an example implementation, the score may be based on position of the paragraph in section. In an example implementation, the rules for scoring paragraphs may be specified in the configuration database 1118 and may vary depending on the category (or sub-category) of the entity. In one example, a bonus may be assigned for desirable characteristics and a penalty may be assigned for undesired characteristics. A bonus may increase a score and a penalty may decrease a score by some determined amount depending on the weighting or importance assigned to the characteristic. For example, the first paragraph in a section may be assigned a bonus. Whole section paragraphs may also receive a bonus. The first and last paragraph of the first section may also receive a bonus. The last paragraph of the last non-ignored section may also receive a bonus. A large penalty may be assigned for long paragraphs that exceed a specified size threshold.

As shown at step 1312, the presentation generation engine may then score each sentence. In an example implementation, the rules for scoring sentences may be specified in the configuration database 1118 and may vary depending on the category (or sub-category) of the entity. In an example implementation, the score may be based on the content of the sentence. For example, keyword matching may be used to identify desired information for a particular category (or sub-category) of entity. In an example implementation, a bonus may be allocated for each keyword that is matched. The bonus may also vary depending on the keyword that is matched. Example keywords may include "born on", "is located at", "married", and "war". These are examples only and other implementations may use other keyword matching or scoring methods. In an example implementation, scoring may also depend on position of a sentence. For example, an additional bonus may be added for the first sentence of a paragraph.

As shown at step 1314, the presentation generation engine may then use the paragraph score and sentence score to select sentences to be added to the narration. In an example implementation, for each sentence, the paragraph score for the paragraph containing the sentence may be added to score for the sentence and the sentences may be added to the narration by scoring order. In an example implementation, a bonus may be added to the score of a sentence that follows another sentence that has been selected for inclusion in the narration.

Additional features associated with or involving aspects of FIG. 13 are set forth in the attached appendix at, inter alia, the QLib_sentences section.

In example implementations, the scoring method may result in a narration built from groups of sentences from different non-contiguous parts of the source data file. For example, the presentation generation engine may select a few sentences from each of several different sections of the source data file to provide information regarding different aspects of an entity rather than using a single contiguous block of text from the source data file for the narration.

In an example implementation, sentences may be added to the narration until it reaches a certain size. For example, in some implementations, the size of the narration may be limited based on a number of characters in the range from 300 characters to 5000 characters or any range subsumed therein. For example, the limit may be 500 characters, 700 characters, 1000 characters, 1500 characters, 2000 characters or 2500 characters in example implementations. The size limit may also vary based on the category (or sub-category) of entity. For example, a person (or a famous person such as an actor) may have a larger size threshold than an entity for an abstract concept. In some example implementations, the score threshold required to add a sentence to the narration may increase as the size increases. For example, a minimum score required to add a sentence may be imposed if the size exceeds an initial threshold even though the maximum limit has not been reached. For example, the required score may be increased if the size exceeds 500 characters, 700 characters, 1000 characters or 1500 characters in some example implementations. These sizes and thresholds are examples only and other implementations may use other limits or criteria for adding sentences to the narration.

As shown at step 1316, the presentation generation engine may then synthesize the text to be used for the narration from the selected sentences. For example, the rules specify items that are difficult to read that should be removed or replaced. For example, in some implementations, text in parenthesis or the name of a state after a city may be removed. These are examples only and other items may be removed or modified to improve the flow of the narration when it is spoken. For example, long names or formal names may be replaced with shorter or simplified names for the same entity. For example, the occurrence of "William Jefferson Clinton" in a sentence may be replaced with the shorter name "Bill Clinton". In example implementations, pattern matching or keyword lookup may be used to identify text to be removed or replaced.

After the narration has been generated, the presentation generation engine may then identify and select media objects to be displayed during the narration. Media objects may be associated with a portion of the narration and displayed or highlighted when that portion of the narration is being played.

Figure 14:
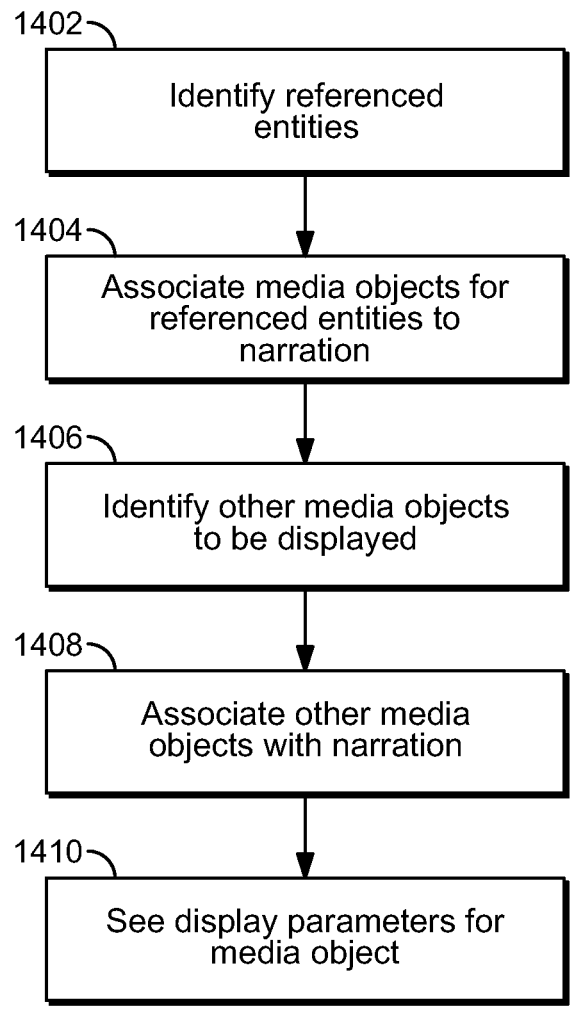
FIG. 14 is a flow diagram showing exemplary features of illustrative methods of selecting media objects for a presentation consistent with one or more aspects related to the innovations herein.

FIG. 14 is a flow chart showing an example method for selecting media objects to display for a portion of a presentation. For example, this method may comprise identifying at least one other entity referenced in the source document associated with the entity and determining whether at least one media object associated with the at least one referenced entity will be displayed in the presentation based on at least one rule. When the determining determines that the at least one media object associated with the at least one referenced entity will be displayed, associating the at least one media object with a portion of the narration corresponding to a portion of the source document wherein the at least one other entity is referenced may be performed. When the determining determines that the at least one media object associated with the at least one referenced entity will be displayed, setting at least one display parameter for the at least one media object associated with the at least one referenced entity may be performed. This is described in greater detail below.

As shown at step 1402, the presentation generation engine may identify entities referenced in the source data used for a particular portion of the narration. For example, if the source data includes a link, footnote or other reference to an article describing another entity or other item associated with another entity, a media object for the other entity may be displayed or highlighted during that portion of the narration. In an example implementation, the primary media object from the entity library 1120 for the other entity is displayed. In an example implementation, this may be an iconic image identified for the respective entity. For example, during a presentation on the Eiffel Tower, the narration may mention Gustave Eiffel. When the narration reads the name of Gustave Eiffel, the presentation may display an image of Gustave Eiffel. In example implementations, this may be the same image of Gustave Eiffel that is used as an icon for a separate presentation on the entity Gustave Eiffel and may be identified as the primary media object for the entity Gustave Eiffel in the entity library 1120. In some example implementations, pattern or keyword matching or other contextual or relevancy criteria may be used to determine whether a portion of a narration is referring to another entity such that the primary media object for that entity should be displayed or highlighted during that portion of the narration. In some example implementations, rules may be specified in configuration database 1118 to determine whether a media object for an entity should be displayed. In some example implementations, links or other references to entities in selected categories or sub-categories may not result in the display of a media object. For example, references to locations may occur frequently in a narration and media objects for those locations may be ignored for purposes of selecting referenced entities to use for displaying media objects.

As shown at step 1404, after the referenced entities have been selected for display, the presentation generation engine may associate the primary media objects for those referenced entities with the respective portion of the narration. For example, this may be accomplished by adding a binding in the presentation description file between the media object and the position in the narration (for example, using the JSON syntax described above).

As shown at step 1406, the presentation generation engine may also identify other media objects that may be displayed during the narration. In example implementations, media objects associated with the respective entity in the entity library 1120 may be selected for display. These images may be displayed or highlighted during portions of the narration that do not display a media object for another referenced entity. For example, in a presentation on the Eiffel Tower, these media objects may include additional images of the Eiffel Tower. In example implementations, the presentation generation engine may select the media objects based on the scores and rankings associated with the media objects in the entity library 1120. In example implementations, scores for selecting media objects may depend on the resolution, size, orientation, and the source from which the media object is obtained (and the location within that source) or other meta data or criteria. For example, a portrait image that is sized to fit well within the display format of the presentation may receive a higher score than a panoramic image that is too large for the display format of the presentation. In some implementations, a bonus may be added for media objects referenced or included in the primary reference source(s) from which the narration was generated. Additional bonuses may be added for media objects located or referenced in or adjacent to the sentence or section from which the particular portion of the narration was generated. Scores may also be adjusted based on media objects that have already been selected for display during a portion of the narration. For example, a variety of images from different sources may be favored. In some implementations, a penalty may be assessed if other media objects from the same data source or with the same attribution have already been selected for display during the same portion of the narration.

As shown at step 1408, after the additional media objects have been selected for display, the presentation generation engine may associate the additional media objects with the respective portion of the narration. In an example implementation, this may be accomplished by adding a binding in the presentation description file between the media object and the position in the narration (for example, using the JSON syntax described above).

Figure 15:
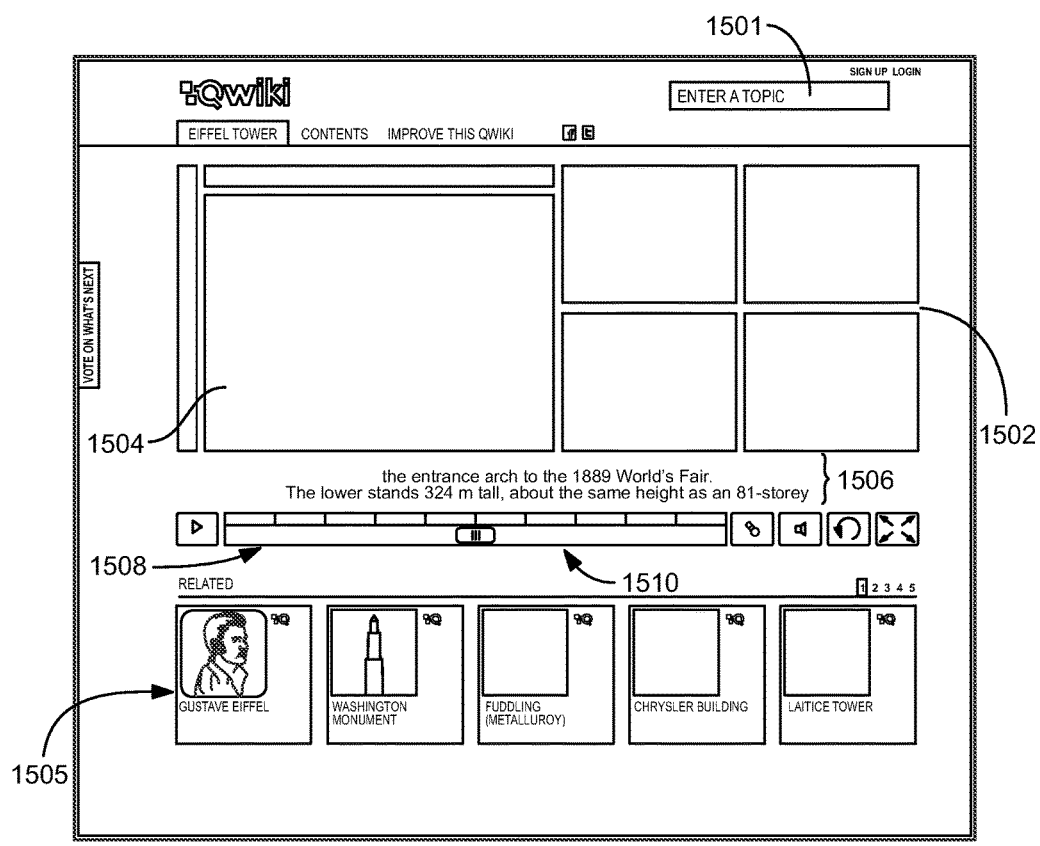
FIG. 15 is a representative system diagram showing an illustrative display of a presentation consistent with one or more aspects related to the innovations herein.

As shown at step 1410, the display parameters for each of the media objects to be displayed may also be set by the presentation generation engine 1108. In an example implementation, the image layout process may split the presentation into one to four screens that may be shown in sequence. Each screen may be displayed for the duration it takes to speak one to about three sentences. As shown in FIG. 15, each screen may have two rows of a small number of columns (for example, between three and five columns in example implementations). The format may vary depending upon the client device platform (for example, the type of device and screen size) or other criteria or preferences. The rows and columns may divide the screen into 6 to 10 slots in an example implementation. Each media object (for example, picture, animation or video) may occupy one to several adjacent slots (for example, 1, 2 or 4 slots in an example implementation). During playback of the presentation in an example implementation, the images may be highlighted one at a time in sequence from top to bottom, left to right. They may be highlighted as the concept they illustrate is spoken if they are tied to a particular phrase or referenced entity. If they are generally relevant to the main topic (or section of the presentation), they may be highlighted at a time when no specific illustration associated with a phrase or referenced entity is available. In an example implementation, the layout algorithm used by the presentation generation engine may, if overall grid space allows, place landscape pictures with high resolution content into 2 horizontally adjacent slot pictures, portrait pictures into 2 vertically adjacent slots and pictures nearly square in shape into a 2 by 2 square set of slots while respecting the time sequence of the associated narration. The highlighting may also magnify the picture while it is featured. This magnification transition may have a time cost associated with it (for example about 1.5 seconds in an example implementation). In an example implementation, each image may be featured for a minimum of 2.5 seconds. In an example implementation, images that are displayed longer than some threshold period of time (for example, 2, 3 or 4 seconds in example implementations) may zoom very slightly to avoid the appearance of completely static images. In another example implementation, images may be scrolled within a slot or magnified group of slots to show a series of images for entities in succession. For example, a narration for an actor (a sub-category of person) may include a list of movies that the actor appeared in. The time between mentioning each movie in the narration may not allow enough time for transitioning between highlighting different images in the presentation. In example implementations, the images associated with each movie entity may be shown in a succession of images in one slot (or the same group of slots), for example with only about 1 second per image. In example implementations, if entities are mentioned without enough time between them for transitions, the images may be displayed in a single area of the display (in an area of from one to four slots), one after the other. In an example implementation, video clips may be featured for their duration, and clips may be selected that play for between about 5 to 10 seconds or any range subsumed therein. In an example implementation, animations may play for durations that are dependent on their complexities, which may be from about 5 to 15 seconds or any range subsumed therein in example implementations. When all the time constraints are satisfied, additional images or other media objects of general interest may be inserted where time is available.

The above display format and sequencing is an example only and other implementations may display media objects in different formats or orders. For example, the number of slots and images on a screen may range from 2 to 30 or any range subsumed therein in other example implementations. In other example implementations, the display time of an image, video clip or animation, or time during which an image, video clip or animation is highlighted or magnified, may range from 1 to 30 seconds or any range subsumed therein. Other implementations may use other formats or sequencing for display. For example, in some implementations, one media object at a time may be displayed in sequence.

In example implementations, the text analysis algorithms in the presentation generation engine may also identify related presentations for a topic. This selection may be based on the popularity of the related presentation, the strength of the linking to the topic (which may be based on pattern or keyword matching or other relevancy criteria in example implementations), and/or the specificity of that link. For instance, "USA" may be a popular topic but may be linked to too many other topics to be an interesting link. In example implementations, the icons for the related presentations may be displayed during the presentation and may be selected by the user (see 1505 in FIG. 15). In an example implementation, the primary media object (for example, an iconic image) for an entity may be used as the icon for the presentation on the topic of that entity. When related presentations are displayed, this icon may be shown as a representation of the presentation in example implementations. For example, as shown at 1505, an image of Gustave Eiffel is displayed for a related presentation on Gustave Eiffel that is displayed at the bottom of the page during a presentation on the Eiffel Tower.

In example implementations, after a presentation description file has been generated, it may be processed or converted into one or more formats for playback on client devices. For example, the text of the narration may be converted to an audio file using text-to-speech software. In an alternate implementation, this may be done by an application on the client device when the presentation is played on the client device. In some implementations, the presentation description file may be converted into a format that can be processed by a Flash media player on the client device.

In example implementations, in addition to generating the presentation, the back-end processing software in the entity generation engine 1106 and presentation generation engine 1108 may produce several index files with a summary of the presentation features, snippet, location, title aliases, overall quality rank, and/or iconic picture. These indexes may be stored in association with the respective entity or presentation in the entity library 1120 or presentation database 1130 in example implementations.

In an example implementation, a user may input a keyword or other selection indicia for selecting a presentation for playback. The presentation selection and display module 1110 may receive the input and provide a list of matching presentations. For example, in some implementations, the presentation database 1130 may be indexed using hash values for the names of entities and aliases. Keyword and phrase searching and matching software may be used to identify potential matches between the input and the presentations available in the presentation database 1130. The user may then select a presentation and the presentation selection and display module 1110 may retrieve and send the presentation to the client device for playback.

In some example implementations, an application on the client device may generate other information that can be used to identify available presentations that may be relevant to a user. For example, the client device may be a mobile device with location awareness. In one example implementation, the client device may be a tablet computer, such as an iPad, with wireless communication connectivity and the ability to determine a location of the device. The location may be sent to the presentation selection and display module

1110. The title, location, icon, and/or other information regarding presentations for entities near the location of the client device may be sent to the client device. The client device may display an element in a graphical user interface for these presentations, and the user may select a presentation from the user interface. For example, the presentations within a selected distance of the current location may be displayed as pins or other indicia on a map. The user may then use a touchscreen interface, mouse, or other selection device to select the presentation for playback. The presentation selection and display module 1110 may then provide the selected presentation (if it has not already been downloaded).

Additional features associated with or involving aspects of FIG. 14 are set forth in the attached appendix at, inter alia, the QLib_output section starting at line 215.

FIG. 15 shows an example user interface on a client device for selection and playback of presentations according to an example implementation. In an example implementation, this may be the display of a browser on a client computer system. As shown at 1501, a topic may be entered in an input box. As described above, a list of matching presentations may be provided in response and a presentation may be selected by the user for playback. In the example implementation shown in FIG. 15, a presentation regarding the Eiffel Tower is being played. As shown at 1502, in this example implementation, the screen for displaying media objects associated with the narrative may have two rows of four columns. The image shown at 1504 may be highlighted and magnified (currently occupying about four slots). The text of the narration currently being played may be shown at 1506. This text may also be spoken (with sound output on the speakers of the client device) as the presentation is being played. The image 1504 may be bound to this portion of the narration in the presentation description file. A film strip tool bar 1508 may show the overall sequence of images displayed throughout the presentation. The slider at 1510 may indicate the current position in the playback. A mouse or other selection device can be used to select a portion of the film strip to skip forward or backward in the presentation. In example implementations with a touchscreen, the film strip may be swiped by the user to slide the presentation forward or backward. Similarly, the user may use a swiping gesture in the area of the screen that displays the images to slide the presentation forward or backwards. In example implementations, the client device may be an iPad or other tablet or smartphone with a multi-touch user interface. In this example, multi-touch finger gestures (for example spreading two fingers apart or squeezing them together on the touchscreen) may be used to zoom in or out all or part of the presentation display. In some example implementations, the whole display may zoom in or out. In other implementations, only the selected media object (image, animation or video clip) may be zoomed in or out. In example implementations, this may cause the image to expand outside of the slots to fullscreen mode or in an overlay layer over other parts of the presentation. In example implementations, this may stop the playback of the presentation until the media object is squeezed back into the form factor of the slots to allow the presentation to continue playing. In other implementations, the presentation may continue to play when a media object is zoomed out (for example, in a separate overlay layer with the presentation continuing to play in the underlying layer). In some example implementations, all elements of the screen may be active elements, and clicking on them may bring up additional information and/or jump into another presentation. In example implementations, each of the media objects being displayed (images, video clips, and/or animations) and the text of the narrative may be selected by the user by using a mouse click, tapping the touchscreen or other selection indicia. In response, the user interface may display a page with additional information about the media object or narration, such as a larger display, a display of the source material in context on the source page, and/or a link to the source page. The user may then select the link to the source page to go to the original source page for additional information. As a result, the presentation may provide a way for a user to browse a variety of information and media objects related to an entity and find linked sources on the Internet for the various types of information and objects. As described above, the implementation of FIG. 15 may also display icons for related presentations at 1505 which may be selected by the user.

Figure 16:
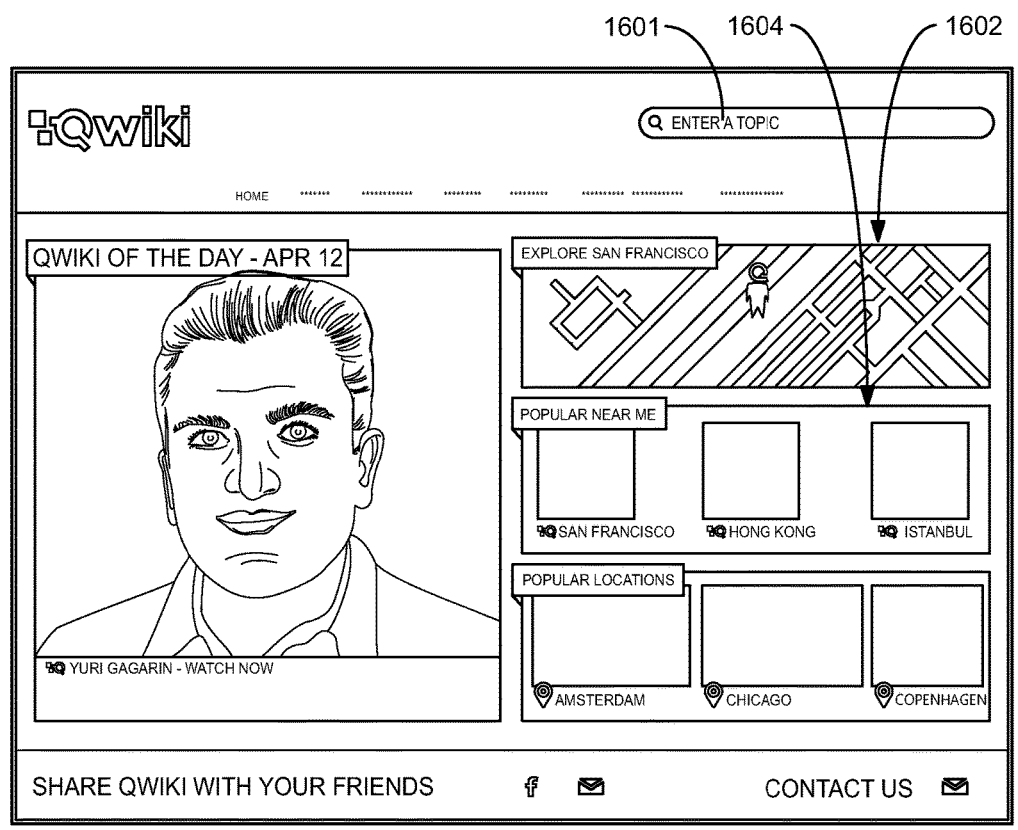
FIG. 16 is a representative system diagram showing an illustrative display of an example user interface consistent with one or more aspects related to the innovations herein.
Figure 17:
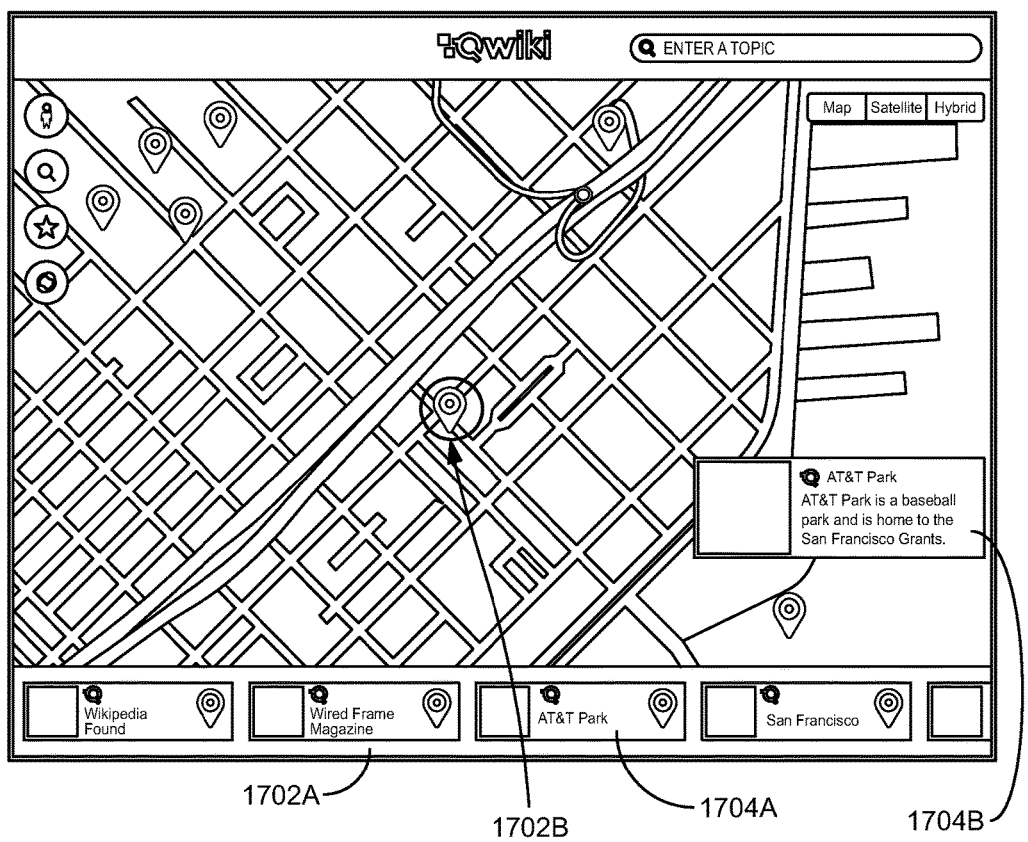
FIG. 17 is representative system diagram showing an illustrative display of an example map based user interface for selecting presentations consistent with one or more aspects related to the innovations herein.

FIG. 16 shows another user interface on a client device according to an example implementation. In this example implementation, the user interface may be provided by application software on a client device that is a tablet, such as an iPad, or other mobile computing device. The user interface may include an input box 1601 for entering keywords to search for presentations similar to box 1501. The user interface may also include a window 1602 showing the current location on a map based on location-based information provided by the mobile computing device. The user interface may also include a window 1604 showing icons for presentations for entities located near the current location that can be selected by the user for playback. An additional location-based interface may be displayed if window 1602 is selected by the user. As shown in FIG. 17, a map may be displayed based on the current location. Maps for other locations may also be selected for display. Presentations related to locations on the map may be shown by pins or other indicia on the map. The name and icon for the presentations may also be displayed at the bottom of the map. For example, 1702A shows the icon, name, and map symbol for a presentation regarding Wired Magazine, which is indicated on the map at 1702B. When the indicia on the map is selected (by touchscreen or other selection device), a pop up layer may be displayed with additional information about the entity from the presentation. For example, a pop up layer with information on AT&T Park is shown at 1704B and the icon for the presentation regarding AT&T Park is also shown at 1704A. In example implementations, either the icon at the bottom of the map or the indicia of the map may be selected to play the presentation. When the presentation is selected, a request may be sent to server system 1102 to download the presentation for playback.

In example implementations, the presentation architecture may also allow for user defined content for presentations. A user can upload a single presentation description file or any number of presentation description files and request to have the presentations generated for creating (or being added to) a corpus of presentations available for delayed viewing, or the presentations can be created for instant consumption and single use. For instance, a real-estate firm could create a presentation description file for each of their listings, or an application on a mobile computing device may generate a presentation for a nearby restaurant. The presentation generation engine 1108 may convert the presentation description files into a format for playback (such as a file for a Flash player). In example implementations, the publishing architecture may be heavily parallelized so that every unit of computation on the voice, images, video, layout, etc. happens in parallel, yielding a presentation ready to be served in minimum time. Further, while a default grid may be used for Qwiki playback, a suite of animations from which a user can choose while building their presentation may be provided.

In example implementations, a user may request a presentation to be automatically generated from a reference source or user entered narrative. The presentation generation engine 1108 may process the reference source to generate a narration or use the text provided by a user. The presentation generation engine 1108 may then select and associate other media objects with the narration for playback as part of the presentation (using media objects from the entity library or sources identified by the user). The presentation description file may then be provided to the user for review and customization. The user may choose to remove or add objects at different locations in the presentation. The modified presentation description file can then be used to generate a presentation. In example implementations, a user may identify social network pages, such as a Facebook page or LinkedIn page that can be used as a reference source to generate a presentation. The presentation generation engine may use text from the page to generate a narration (or the user may provide a narration) and select media objects from the page for display during the presentation. Images and media objects from pages of friends or others linked on the social network may be displayed as well. For example, when a friend is mentioned in the narrative, the image used by that person to identify himself or herself on the social network may be displayed (similar to the way that iconic images for an entity may be displayed in the example implementations described above).

Example implementations may also include presentations for real-time information, such as the weather, movies currently playing at a theater, stock performance for a company, breaking news, or other dynamic information. A template and media objects for the presentation may be generated using any of the methods described above, with variable fields for real-time data to be resolved at run-time. When the presentation is played back, the client browser or application may send a request for the data to a data source (such as a web site or database with public APIs for requesting weather, movies currently playing, stock performance, breaking news, or other dynamically changing information). The real-time data may then be displayed as part of the presentation in an animation or other media object.

Various computer systems and network architectures may be used in connection with example implementations. Example implementations may include a computer system having at least one processor, at least one memory, and at least one program module, the program module stored in the memory and configured to be executed by the processor, wherein the at least one program module includes instructions for performing one or more of the features described above or in the description below. In another example implementation, a computer readable medium may be provided with executable instructions for performing one or more of the features described above or in the description below.

In an example implementation, the query interface, the database and the various processing engines may comprise software program modules executed by a computer system. In an example implementation, the computer system may be a server or plurality of servers in communication with the Internet or other network. The program modules may be stored in memory or storage and retrieved for execution by one or more processors. The templates, media and other data may be stored in memory or storage and retrieved for processing or display. In an example implementation, a server system may provide a user interface to a client computer system for display. For example, the user interface may be displayed by web browser software or other application software on the client computer system. In example implementations, the client computer system may be a personal computer, tablet or a mobile smartphone or other mobile computing device. In example implementations, the client computer may be an iPad tablet computer or an Android-based tablet computer. The application software on the client computer may accept input of keywords and other search or selection parameters that are transmitted to the server computer. In example implementations, the server computer may select and transmit a presentation to the client computer for display. In example implementations, the presentation may be provided in XML, JSON, and/or other format to the client system for display. In example implementations, the presentation may include links to other data and media to be retrieved and displayed by the client device as described above. In example implementations, the presentation may also be interactive and be responsive to clicks or other selection indicia by the user. In example implementations, the server system may also retrieve data from other servers on the network for use in generating presentations as described herein. In example implementations, the server system may query search engines, databases, and/or other references sources or crawl web sites to obtain data for use in generating and assembling presentations.

Figure 18:
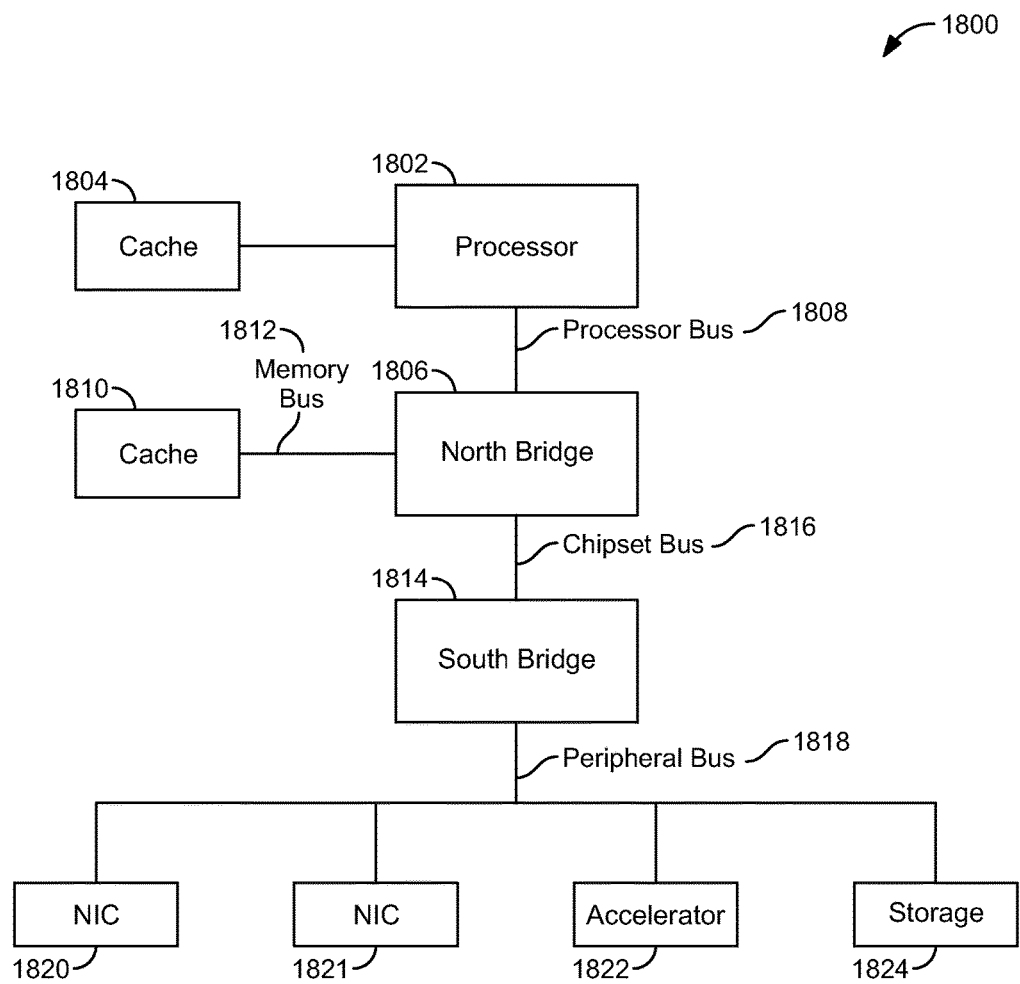
FIG. 18 is a block/flow diagram showing an illustrative architecture of a computer system that may be used in connection with the one or more aspects of the innovations herein.

FIG. 18 is a block diagram showing an example architecture of a computer system 1800 that may be used in connection with example implementations of the present invention. This example architecture may be used for one or more server systems or client devices used in connection with example implementations. This computer architecture is an example only and other computer architectures may be used in example implementations. For example, commercially available server computer systems may be used in connection with example implementations. In example implementations, client devices used in connection with example implementations may include personal computers, tablet computers, personal digital assistants (PDAs), and/or other mobile computing devices such as the iPad or iPhone available from Apple Computer, Inc. and Android-based mobile devices available Motorola, Samsung and other vendors. In example implementations, the user interface and presentation may be displayed using browser software or application software on the client device. A mouse, touchscreen, keyboard or other selection device on the client may be used to interact with the user interface and presentation.

As shown in FIG. 18, an example computer system may include a processor 1802 for processing instructions. Multiple threads of execution may be used for parallel processing. In some implementations, multiple processors or processors with multiple cores may also be used, whether in a single computer system, in a cluster or distributed across systems over a network.

As shown in FIG. 18, a high speed cache 1804 may be connected to, or incorporated in, the processor 1802 to provide a high speed memory for instructions or data that have been recently, or are frequently, used by processor 1802. The processor 1802 may be connected to a north bridge 1806 by a processor bus 1808. The north bridge 1806 may be connected to random access memory (RAM) 1810 by a memory bus 1812 and may manage access to the RAM 1810 by the processor 1802. The north bridge 1806 may also be connected to a south bridge 1814 by a chipset bus 1816. The south bridge 1014 may be connected to a peripheral bus 1818. The peripheral bus may be, for example, PCI, PCI Express, or other peripheral bus. The north bridge and south bridge may be referred to as a processor chipset and may manage data transfer between the processor, RAM, and peripheral components on the peripheral bus 1818. In some alternative example architectures, the functionality of the north bridge may be incorporated into the processor instead of using a separate north bridge chip.

Software and data are stored in external storage 1824 and may be loaded into RAM 1810 and/or cache 1804 for use by the processor. The system 1800 may include an operating system for managing system resources, such as Linux or other operating system, as well as application software running on top of the operating system in accordance with example implementations of the present invention.

In this example, system 1800 may also include network interface cards (NICs) 1820 and 1821 connected to the peripheral bus for providing network interfaces to external storage and other computer systems and networks that can be used for distributed parallel processing, data retrieval and searching, and/or transmission and receipt of communications between server and client devices. The depicted example in FIG. 18 and above-described examples are not meant to imply architectural limitations and are examples only.

Figure 19:
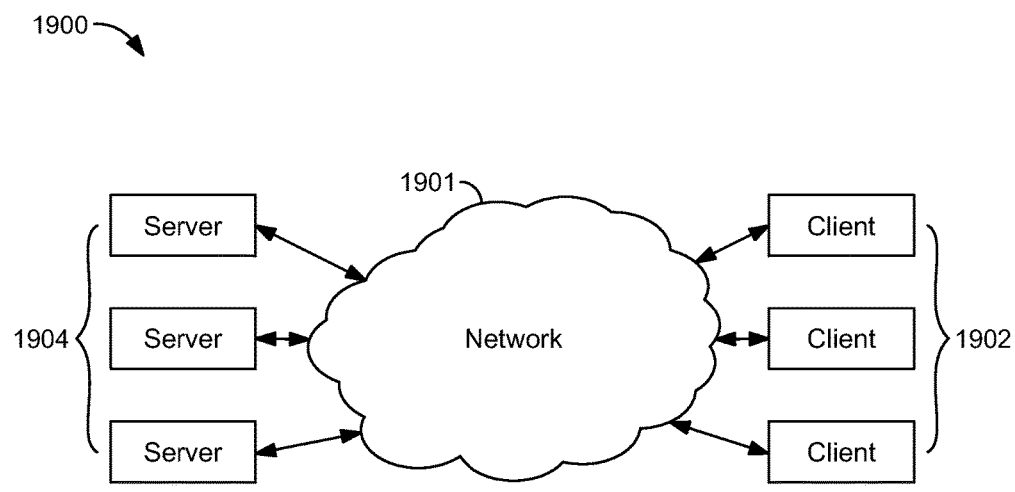
FIG. 19 is a block/flow diagram showing an illustrative example computer network that may be used in connection with the one or more aspects of the innovations herein.

FIG. 19 illustrates an example communications system 1900. The communications system 1900 may include a network 1901, which may provide communications between various devices and computers connected together within system 1900. The network 1901 may provide communication between a plurality of client devices 1902 and a plurality of servers 1904. The network may include both wired and wireless connections between devices. This is an example only and other implementations may use other networks or communications between devices. In example implementations, the network may include the Internet and/or cellular and other wireless communications systems. Example connections provided by the network may include cables, optical fibers, WiFi, 2G, 3G and 4G communications networks and other telecommunications infrastructure. The servers 1904 may provide data and information to client devices and may also manage communications within the network. In an example implementation, one or more of the servers may be used to provide a web-based application for collecting data from other servers for use in presentations and assembling and generating presentations to be sent to the client devices. The client devices may include communications software for interacting with the servers, such as a web browser or mobile application. For example, client software may be downloaded from an application store for use on a tablet computer, such as the iPad or other mobile computing device, for interacting with the server and displaying the assembled presentations to the user. FIG. 19 is an example only, and is not intended to limit the network architectures that may be used in connection with example implementations of the present invention.

Additionally, the innovations herein may be achieved via implementations with disparate or entirely different software, hardware and/or firmware components, beyond that set forth above. With regard to such other components (e.g., software modules, computing/processing components, etc.) and/or computer-readable media associated with or embodying the present inventions, for example, aspects of the innovations herein may be implemented consistent with numerous general purpose or special purpose computing configurations. Various exemplary computing systems, environments, and/or configurations that may enable or be suitable for use with the innovations herein may include, but are not limited to: various software or other components within or embodied on smart phones or other PDA devices or personal computing components, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of code structures or circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the present inventions. Accordingly, it is intended that the invention be limited only to the extent required by the applicable rules of law.

The invention claimed is:

1. A method comprising:
   receiving, by a processor, input relating to a subject for a multimedia module or multimedia presentation, the multimedia module or multimedia presentation comprising a plurality of scenes;
   selecting, by the processor, one of a plurality of automatically generated multimedia presentations corresponding to the input, the plurality of automatically generated multimedia presentations generated for display as animations; and
   transmitting, by the processor, the selected presentation to a display device for display as an animation, the animation comprising the plurality of scenes, each scene in the plurality displayed with a transition between each scene, one or more of the plurality of scenes comprising a map, each scene comprising an interactive trigger that pauses playback of the animation, the transition between each scene based on a transition selected from a library of pre-created transitions,
   wherein each of the plurality of automatically generated presentations is generated by:
      selecting, by the processor, an entity as a subject of the presentation from among a plurality of entities,
      generating, by the processor, a narrative for the selected entity, the narrative generated as an audio media object for playing as spoken words, the generating of the narrative comprising selecting a data source as a primary reference source for generating the narrative, and
      selecting, by the processor, a media object associated with the entity, the media object displayed, played, or highlighted at a portion of the narrative corresponding to the entity.

2. The method of claim 1, further comprising generating at least one of the plurality of entities by performing at least one of:
   receiving data associated with an entity that is a potential subject of the presentation;
   categorizing the entity in at least one of a plurality of media categories;

storing the entity in an entity library;
identifying at least one media object relating to the entity;
ranking the at least one media object; or
selecting one of the at least one media objects as a primary media object for the entity.

3. The method of claim 2, further comprising filtering the categorized entity based on criteria associated with the entity library.

4. The method of claim 2, wherein storing the entity in the entity library includes at least one of:
associating the entity with its at least one category in the entity library;
associating the entity with at least one media object in the entity library; or
associating the entity with at least one alternative name for the entity in the entity library.

5. The method of claim 2, wherein identifying the at least one media object comprises searching at least one data source for media objects associated with the entity.

6. The method of claim 2, wherein ranking the at least one media object comprises:
identifying duplicate media objects and discarding all but one of the duplicate media objects;
identifying similar media objects, wherein the similar media objects differ in data size, and discarding all but one of the similar media objects having the greatest size; and
categorizing a plurality of the at least one media objects within at least one media object category and ranking each of the plurality of the at least one media objects within the at least one media object category according to criteria associated with the at least one media object category.

7. The method of claim 2, wherein selecting the one of the at least one media objects as a primary media object for the entity comprises selecting a highest ranked one of the at least one media objects as a primary media object for the entity.

8. The method of claim 1, wherein generating the narrative comprises at least one of:
receiving a source document associated with the entity from the selected data source;
parsing the source document;
classifying the parsed contents of the source document;
defining at least one text section by identifying text section boundaries in the source document;
scoring the at least one identified text section in the document based on content or position of the at least one identified text section; or
selecting at least one of the at least one scored text sections to be added to a narration, the selecting based on a score of the at least one of the at least one scored text sections.

9. The method of claim 8, wherein the classification of the parsed contents of the source document is based on metadata or title keyword matching.

10. The method of claim 8, wherein the at least one text section is a paragraph or a sentence.

11. The method of claim 8, further comprising synthesizing the at least one selected text section into audio.

12. The method of claim 8, wherein selecting the at least one media object comprises at least one of:
identifying at least one other entity referenced in the source document associated with the entity;
determining whether at least one media object associated with the at least one referenced entity will be displayed in the presentation based on at least one rule;
when the determining determines that the at least one media object associated with the at least one referenced entity will be displayed, associating the at least one media object with a portion of the narration corresponding to a portion of the source document wherein the at least one other entity is referenced; or
when the determining determines that the at least one media object associated with the at least one referenced entity will be displayed, setting at least one display parameter for the at least one media object associated with the at least one referenced entity.

13. The method of claim 12, wherein the at least one rule for determining whether the at least one media object associated with the at least one referenced entity will be displayed in the presentation comprise a pattern matching rule, a keyword matching rule, contextual criteria, relevancy criteria, or ignoring specified references.

14. The method of claim 12, wherein the at least one media object associated with the at least one referenced entity is a primary media object for the referenced entity.

15. The method of claim 12, wherein setting the at least one display parameter comprises:
arranging the at least one media object on a grid associated with a display screen;
highlighting the at least one media object at a time corresponding to the portion of the narration associated with the at least one media object;
magnifying the at least one media object at a time corresponding to the portion of the narration associated with the at least one media object;
scrolling the at least one media object; and
setting a display duration for the at least one media object.

16. The method of claim 1, wherein:
the input relating to a subject for a presentation comprises a search query generated by a remote user; and
receiving the input relating to a subject for a presentation comprises receiving the input via a network.

17. The method of claim 1, wherein returning the presentation comprises transmitting the presentation to a remote device via a network.

18. A method comprising:
receiving, by a processor, input relating to a subject for a multimedia module, the multimedia module comprising a plurality of scenes;
generating the multimedia module as an animation, each scene in the plurality displayed with a transition between each scene, one or more of the plurality of scenes comprising a map, each scene comprising an interactive trigger that pauses playback of the animation, the transition between each scene based on a transition selected from a library of pre-created transitions, the generating including:
selecting an entity as a subject of the presentation from among a plurality of entities;
developing a narrative for the selected entity, the narrative developed as an audio media object for playing as spoken words, the generating of the narrative comprising selecting a data source as a primary reference source for generating the narrative; and
selecting a media object associated with the entity, the media object displayed, played, or highlighted at a portion of the narrative corresponding to the entity.

19. A non-transitory computer-readable storage medium containing executable program instructions executed by a processor for processing data, the executable program instructions including instructions for:

accepting at least one input keyword relating to a subject for a multimedia module, the multimedia module comprising a plurality of scenes and generated for display as an animation, each scene in the plurality displayed with a transition between each scene, one or more of the plurality of scenes comprising a map, each scene comprising an interactive trigger that pauses playback of the animation, the transition between each scene based on a transition selected from a library of pre-created transitions; and accessing a set of at least two templates, wherein each template generates a different type of output, and wherein each template includes components for a parameter selected from parameter types consisting of display time, screen location, and animation parameters, wherein the multimedia module is generated by:
- selecting an entity as a subject of the module from among a plurality of entities,
- generating a narrative for the selected entity, the narrative generated as an audio media object for playing as spoken words, the generating of the narrative comprising selecting a data source as a primary reference source for generating the narrative, and
- selecting a media object associated with the entity, the media object displayed, played, or highlighted at a portion of the narrative corresponding to the entity.

20. A non-transitory computer-readable storage medium containing executable program instructions executed by a processor for processing data, the executable program instructions including instructions for:
- receiving, by the processor, input relating to a subject for a multimedia module, the multimedia module comprising a plurality of scenes; and
- generating, by the processor, the multimedia module as an animation, the animation comprising the plurality of scenes, one or more of the plurality of scenes comprising a map each scene comprising an interactive trigger that pauses playback of the animation, a transition between each scene based on a transition selected from a library of pre-created transitions, each scene in the plurality displayed with the transition between each scene by:
  - selecting an entity as a subject of the presentation from among a plurality of entities,
  - generating a narrative for the selected entity, the narrative generated as an audio media object for playing as spoken words, the generating of the narrative comprising selecting a data source as a primary reference source for generating the narrative; and
  - selecting at least one media object associated with the entity, the media object displayed, played, or highlighted at a portion of the narrative corresponding to the entity.

* * * * *